(12) United States Patent
Cheng et al.

(10) Patent No.: US 10,271,311 B2
(45) Date of Patent: Apr. 23, 2019

(54) TRIGGER METHOD AND RELATED APPARATUS

(71) Applicant: Huawei Technologies Co., Ltd., Shenzhen (CN)

(72) Inventors: Xingqing Cheng, Beijing (CN); Fang Nan, Beijing (CN); Zheng Yu, Beijing (CN); Ningbo Zhang, Shenzhen (CN); Deping Liu, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 14/710,775

(22) Filed: May 13, 2015

(65) Prior Publication Data

US 2015/0245340 A1   Aug. 27, 2015

Related U.S. Application Data

(63) Continuation of application No. PCT/CN2012/084590, filed on Nov. 14, 2012.

(51) Int. Cl.
| | | |
|---|---|---|
| *H04W 72/04* | (2009.01) | |
| *H04W 48/12* | (2009.01) | |
| *H04W 52/02* | (2009.01) | |

(52) U.S. Cl.
CPC ....... *H04W 72/0406* (2013.01); *H04W 48/12* (2013.01); *H04W 52/0216* (2013.01);
(Continued)

(58) Field of Classification Search
CPC ......... H04W 72/0406; H04W 52/0229; H04W 52/0216; H04W 52/0219; H04W 48/12; Y02D 70/21; Y02D 70/1262
See application file for complete search history.

(56) References Cited

U.S. PATENT DOCUMENTS

2008/0212506 A1* 9/2008 Lee ............... H04W 72/042
                                                         370/310
2009/0203383 A1   8/2009 Shen et al.
(Continued)

FOREIGN PATENT DOCUMENTS

| CN | 101841892 A | 9/2010 |
|---|---|---|
| CN | 102123524 A | 7/2011 |

(Continued)

OTHER PUBLICATIONS

Kuo et al., U.S. Appl. No. 61/586,255 Method and apparatus for enhancement of QoS measurement and machine type communications in a wireless communication system filed Jan. 13, 2012. (Year: 2012).*

(Continued)

*Primary Examiner* — Ian N Moore
*Assistant Examiner* — Justin T Van Roie
(74) *Attorney, Agent, or Firm* — Slater Matsil, LLP

(57) ABSTRACT

Embodiments of the present invention disclose a trigger method and related apparatus. The embodiments of the present invention include: determining time-frequency resource configuration information of a physical trigger channel PTCH; detecting one PTCH on a time-frequency resource occupied by the one PTCH indicated by the time-frequency resource configuration information of the PTCH; determining whether triggering exists according to a PTCH detection result, where the triggering is used to indicate that first information needs to be transmitted in a first information subframe or a first information opportunity associated with the PTCH; and transmitting the first information in the first information subframe or the first information opportunity associated with the PTCH if it is determined that the triggering exists.

21 Claims, 9 Drawing Sheets

(52) U.S. Cl.
CPC ... *H04W 52/0219* (2013.01); *H04W 52/0229* (2013.01); *Y02D 70/1262* (2018.01); *Y02D 70/21* (2018.01)

(56) References Cited

U.S. PATENT DOCUMENTS

| | | | | |
|---|---|---|---|---|
| 2010/0272037 A1* | 10/2010 | Lee | ............... | H04W 52/0235 370/329 |
| 2011/0159867 A1* | 6/2011 | Kuo | ............... | H04W 74/0833 455/422.1 |
| 2012/0087314 A1* | 4/2012 | Maeda | ............... | H04L 5/001 370/328 |
| 2013/0182626 A1* | 7/2013 | Kuo | ............... | H04W 52/0216 370/311 |
| 2013/0301608 A1* | 11/2013 | Frenne | ............... | H04W 74/004 370/331 |

FOREIGN PATENT DOCUMENTS

| | | | |
|---|---|---|---|
| CN | 102594513 A | | 7/2012 |
| JP | 2007214711 A | | 8/2007 |
| WO | 2009063422 A1 | | 5/2009 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.1.0 , Sep. 2012, 325 pages.

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.0.0, Sep. 2012, 106 pages.

"3rd Generation Partnership Project; Technical Specification Group Radio Access Network; Evolved Universal Terrestrial Radio Access (E-UTRA); Multiplexing and channel coding (Release 11)," 3GPP TS 36.212 V11.0.0 , Sep. 2012, 79 pages.

"Review of Approaches for Bandwidth Reduction for Low Complexity MTC LTE UEs," 3GPP TSG RAN WG1 Meeting #67, R1-114267, Source: IPWireless Inc., Agenda Item 7.8, Nov. 2011, 6 pages.

"TP for Evaluation/Analysis of Reduction of Maximum Bandwidth," 3GPP TSG RAN WG1 Meeting #68, R1-120290, Source: ZTE Corporation, Agenda Item 7.7.1, Feb. 6-10, 2012, 4 pages.

"Support of Reduced Maximum Bandwidth for Low-Cost MTC EUs," 3GPP TSG RAN WG1 Meeting #68, R1-120510, Source: Alcatel-Lucent, Alcatel-Lucent Shanghai Bell, Agenda Item 7.7.1, Feb. 6-10, 2012, 4 pages.

"Solutions on Coverage Improvement for Low Cost MTC," 3GPP TSG RAN WG1 Meeting #71, R1-124705, Source: Huawei, HiSilicon, Agenda Item 6.3.3, Nov. 12-16, 2012, 8 pages.

Huawei et al., "On the EPDCCH starting symbol," 3GPP TSG RAN WG1 Meeting #71, R1-124698, New Orleans, USA, Nov. 12-16, 2012, 4 pages.

* cited by examiner

TRIGGER METHOD AND RELATED APPARATUS

This application is a continuation of International Application No. claims the benefit of U.S. Provisional Application No. PCT/CN2012/084590, filed on Nov. 14, 2012 which is incorporated herein by reference.

TECHNICAL FIELD

The present invention relates to the field of communications technologies, and in particular to a trigger method and related apparatus.

BACKGROUND

With the development of the Internet of Things, the number of machine-to-machine (M2M) devices increases as well. The standardization organization 3rd Generation Partnership Project (3GPP) specially establishes a project team "Provision of low-cost MTC UEs based on LTE", which studies low-cost machine type communication (MTC) terminals based on Long Term Evolution (LTE). The research on low-cost MTC terminals based on LTE mainly considers enhancement or optimization of an LTE network and an air interface with respect to the introduction of MTC devices, where a coverage issue is one of key concerns of operators. In view of cost and frequency spectrum factors, operators put forward new demands: in comparison with a current LTE system, coverage of the LTE system needs to be enhanced by 20 dB when the LTE system provides services to an MTC terminal.

Aiming at the demand of operators for a 20 dB coverage enhancement of the LTE system, a repetition manner is adopted in the prior art to enhance an LTE physical channel. Taking a physical downlink control channel (PDCCH) with coverage enhancement or an enhanced physical downlink control channel (ePDCCH) with coverage enhancement as an example, a coverage enhancing method is: a base station repeatedly sends downlink control information (DCI) carried on a PDCCH or an ePDCCH in control channel elements (CCE) or enhanced control channel elements (eCCE) in N (N is a positive integer) consecutive subframes, and an MTC UE combine information content of the CCEs or eCCEs received in the N subframes, and performs detection, thereby improving detection performance. Such detection of a PDCCH or an ePDCCH with coverage enhancement requires that a UE firstly extract CCE or eCCE information, of the PDCCH or ePDCCH with coverage enhancement, mapped into the N subframes, then combine the CCE or eCCE information content in the N subframes, and finally perform decoding.

It can therefore be seen that, the UE may know whether its own DCI exists only after detecting the PDCCH or ePDCCH, that is, the UE may know whether a base station sends the DCI to the UE by detecting the PDCCH or ePDCCH in each subframe or detecting the PDCCH or ePDCCH with coverage enhancement in the subframe where the PDCCH or ePDCCH with the coverage enhancement is located. However, the base station may not send the DCI to all UEs; therefore, the DCI of the UE does not always exist in one subframe or in the subframe where the PDCCH or ePDCCH with coverage enhancement is located, but all UEs may need to detect the PDCCH or ePDCCH, which is undoubtedly a waste of the power of these UEs. Especially for the MTC UE, the PDCCH or ePDCCH with coverage enhancement requires extraction of a mass of information and complex blind detection; and if the MTE UE does not find its own DCI after detection and when N is very large, the waste of the power consumption of the MTC UE is serious, which is adverse for the MTC UE powered by a battery.

SUMMARY

Embodiments of the present invention provide a trigger method and related apparatus, used to prevent a UE from performing unnecessary detection on a PDCCH or an ePDCCH, thereby achieving the purpose of saving UE power.

In view of this, a first aspect of the present invention provides a trigger method, which may include:
determining time-frequency resource configuration information of a physical trigger channel PTCH;
detecting one PTCH on a time-frequency resource occupied by the one PTCH indicated by the time-frequency resource configuration information of the PTCH;
determining whether triggering exists according to a PTCH detection result, where the triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data; and
transmitting the first information in the first information subframe or the first information opportunity associated with the PTCH if it is determined that the triggering exists.

In a first possible implementation manner, the time-frequency resource configuration information of the PTCH includes: one or more of the following: a start frame number of the PTCH, at least one subframe number, at least one time slot serial number, at least one symbol serial number, a period, the number of subframes occupied by the PTCH, a serial number of a first physical resource block PRB occupied by the PTCH, the number of PRBs occupied by the PTCH, a serial number of a first subcarrier occupied by the PTCH, the number of subcarriers occupied by the PTCH, and power configuration adopted by PTCH transmission, where the period is a time interval between two PTCHs.

With reference to the first aspect or the first possible implementation manner of the first aspect, in a second possible implementation manner, the determining time-frequency resource configuration information of a PTCH includes: determining the time-frequency resource configuration information of the PTCH according to a preset convention between a base station and a UE; or, determining the time-frequency resource configuration information of the PTCH according to one or more types of signaling of radio resource control RRC common signaling, RRC dedicated signaling, media access control MAC control element CE signaling, physical layer signaling, and a random access response RAR.

With reference to the first aspect or the first possible or second possible implementation manner of the first aspect, in a third possible implementation manner, the method further includes: determining the first information subframe or the first information opportunity associated with the PTCH, where the determining the first information subframe or the first information opportunity associated with the PTCH includes: determining the first information subframe or the first information opportunity associated with the PTCH according to the time-frequency resource configuration information of the PTCH and a preset time offset; or, determining the first information subframe or the first information opportunity associated with the PTCH according to the time-frequency resource configuration information of the PTCH and resource configuration information of the first information.

With reference to the third possible implementation manner, in a fourth possible implementation manner, the resource configuration information of the first information includes one or more of the following: a start frame number of first information transmission, at least one subframe number, at least one time slot serial number, at least one symbol serial number, a period, the number of subframes occupied by one first information transmission, a serial number of a first PRB occupied by the first information transmission, the number of PRBs occupied by the first information transmission, a serial number of a first subcarrier occupied by the first information transmission, the number of subcarriers occupied by the first information transmission, and power configuration adopted by the first information transmission, where the period is a time interval between two first information transmissions.

With reference to the third or fourth possible implementation manner, in a fifth possible implementation manner, the method further includes: determining the resource configuration information of the first information according to one or more types of signaling of RRC common signaling, RRC dedicated signaling, MAC control element CE signaling, physical layer signaling, and a RAR.

In a sixth possible implementation manner, before the detecting one PTCH on a time-frequency resource occupied by the one PTCH indicated by the time-frequency resource configuration information of the PTCH, the method includes: receiving one or more sequences on the time-frequency resource occupied by the one PTCH.

With reference to the sixth possible implementation manner, in a seventh possible implementation manner, the detecting one PTCH on a time-frequency resource occupied by the one PTCH indicated by the time-frequency resource configuration information of the PTCH includes: detecting the received sequences on the time-frequency resource occupied by the one PTCH indicated by the time-frequency resource configuration information of the PTCH by using a pre-configured sequence to obtain the PTCH detection result.

With reference to the seventh possible implementation manner, in an eighth possible implementation manner, the pre-configured sequence is determined based on sequence configuration information, where the sequence configuration information includes one or more of the following information: index indication information of the sequence, length indication information of the sequence, index indication information of a root sequence for generating the sequence, and length indication information of the root sequence.

With reference to the eighth possible implementation manner, in a ninth possible implementation manner, the sequence configuration information is determined in the following manner: determining the sequence configuration information according to a preset convention between a base station and a UE; or, determining the sequence configuration information according to one or more types of signaling of RRC common signaling, RRC dedicated signaling, MAC control element CE signaling, physical layer signaling, and a RAR; or, determining the sequence configuration information according to a random access preamble sent by the UE.

With reference to any one of the sixth to ninth possible implementation manners of the first aspect, in a tenth possible implementation manner, the determining whether triggering exists according to a PTCH detection result includes: determining that the triggering exists if the PTCH detection result is greater than or equal to a preset threshold; otherwise, determining that no triggering exists.

In an eleventh possible implementation manner, before the detecting one PTCH on a time-frequency resource occupied by the one PTCH indicated by the time-frequency resource configuration information of the PTCH includes: receiving data transmitted by the PTCH on the time-frequency resource occupied by the one PTCH, where the data transmitted by the PTCH carries indication information used to distinguish uplink triggering from downlink triggering and cyclic redundancy check CRC information, and the CRC information is scrambled by using a radio network temporary identifier RNTI specific for a cell, a UE, or a group of UEs.

With reference to the eleventh possible implementation manner, in a twelfth possible implementation manner, the detecting one PTCH on a time-frequency resource occupied by the one PTCH indicated by the time-frequency resource configuration information of the PTCH includes: extracting PTCH information of the received data transmitted by the PTCH in each subframe on the time-frequency resource occupied by the one PTCH indicated by the time-frequency resource configuration information of the PTCH; combining and then decoding the extracted PTCH information, or decoding and then combining the extracted PTCH information; and descrambling the CRC information by using the RNTI specific for a cell, a UE, or a group of UEs, and performing checking by using the descrambled CRC information and obtaining the PTCH detection result according to a CRC check result.

With reference to the eleventh or twelfth possible implementation manner of the first aspect, in a thirteenth possible implementation manner, the determining whether the triggering exists according to a PTCH detection result includes: if the cell-specific RNTI is used to descramble the cell CRC information and a CRC check result is correct, determining that common triggering exists; if the UE-specific RNTI is used to descramble the cell CRC information and the CRC check result is correct, determining that dedicated triggering exists; if an RNTI specific for a group of UEs is used to descramble the cell CRC information and the CRC check result is correct, determining that group triggering exists; otherwise, determining that no triggering exists.

In a fourteenth possible implementation manner, after the determining whether the triggering exists according to a PTCH detection result, the method further includes: if it is determined that no triggering exists, entering a micro-sleep state until the PTCH is detected on a time-frequency resource occupied by a next PTCH.

A second aspect of the present invention provides a trigger method, which may include:

determining time-frequency resource configuration information of a physical trigger channel PTCH;

sending one PTCH on a time-frequency resource occupied by the one PTCH indicated by the time-frequency resource configuration information of the PTCH, so that a UE detects the sent PTCH on the time-frequency resource occupied by the one PTCH and determines whether triggering exists according to a PTCH detection result, where the triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data; and the UE transmits the first information in the first information subframe or the first information opportunity associated with the PTCH if it is determined that the triggering exists.

In a first possible implementation manner of the second aspect, the time-frequency resource configuration information of the PTCH includes: one or more of the following: a start frame number of the PTCH, at least one subframe number, at least one time slot serial number, at least one symbol serial number, a period, the number of subframes occupied by the PTCH, a serial number of a first physical resource block PRB occupied by the PTCH, the number of PRBs occupied by the PTCH, a serial number of a first subcarrier occupied by the PTCH, the number of subcarriers occupied by the PTCH, and power configuration adopted by PTCH transmission, where the period is a time interval between two PTCHs.

With reference to the second aspect or the first possible implementation manner of the second aspect, in a second possible implementation manner, the determining time-frequency resource configuration information of a PTCH includes: determining the time-frequency resource configuration information of the PTCH according to a preset convention between a base station and a UE; or presetting the time-frequency resource configuration information of the PTCH and sending one or more types of signaling of radio resource control RRC common signaling, RRC dedicated signaling, media access control MAC control element CE signaling, physical layer signaling, and a random access response RAR, where the one or more types of signaling include the time-frequency resource configuration information of the PTCH.

With reference to the second aspect or the first or second possible implementation manner of the second aspect, in a third possible implementation manner, the method further includes: determining the first information subframe or the first information opportunity associated with the PTCH; where the determining the first information subframe or the first information opportunity associated with the PTCH includes: determining the first information subframe or the first information opportunity associated with the PTCH according to the time-frequency resource configuration information of the PTCH and a preset time offset; or determining the first information subframe or the first information opportunity associated with the PTCH according to the time-frequency configuration information of the PTCH and resource configuration information of the first information.

With reference to the third possible implementation manner, in a fourth possible implementation manner, the resource configuration information of the first information includes one or more of the following: a start frame number of first information transmission, at least one subframe number, at least one time slot serial number, at least one symbol serial number, a period, the number of subframes occupied by one first information transmission, a serial number of a first PRB occupied by the first information transmission, the number of PRBs occupied by the first information transmission, a serial number of a first subcarrier occupied by the first information transmission, the number of subcarriers occupied by the first information transmission, and power configuration adopted by the first information transmission, where the period is a time interval between two first information transmissions.

With reference to the third or fourth possible implementation manner of the second aspect, in a fifth possible implementation manner, the method further includes: presetting the resource configuration information of the first information and sending one or more types of signaling of RRC common signaling, RRC dedicated signaling, MAC control element CE signaling, physical layer signaling, and a RAR, where the one or more types of signaling include the resource configuration information of the first information.

In a sixth possible implementation manner, the sending one PTCH on a time-frequency resource occupied by the one PTCH indicated by the time-frequency resource configuration information of the PTCH, so that a UE detects the sent PTCH on the time-frequency resource occupied by the one PTCH includes: sending one or more sequences on the time-frequency resource occupied by the one PTCH, so that the UE detects the received sequences on the time-frequency resource occupied by the one PTCH indicated by the time-frequency resource configuration information of the PTCH by using a pre-configured sequence to obtain the PTCH detection result.

With reference to the sixth possible implementation manner, in a seventh possible implementation manner, the pre-configured sequence is determined based on sequence configuration information, where the sequence configuration information includes one or more of the following information: index indication information of the sequence, length indication information of the sequence, index indication information of a root sequence for generating the sequence, and length indication information of the root sequence.

With reference to the seventh possible implementation manner, in an eighth possible implementation manner, the sequence configuration information is determined in the following manner: determining the sequence configuration information according to the preset convention between the base station and the UE; or presetting the sequence configuration information and sending one or more types of signaling of RRC common signaling, RRC dedicated signaling, MAC control element CE signaling, physical layer signaling, and a random access response RAR, where the one or more types of signaling include the sequence configuration information; or, determining the sequence configuration information according to a random access preamble sent by the UE.

In a ninth possible implementation manner, the sending one PTCH on a time-frequency resource occupied by the one PTCH indicated by the time-frequency resource configuration information of the PTCH, so that a UE detects the sent PTCH on the time-frequency resource occupied by the one PTCH includes:

sending data transmitted by the PTCH on the time-frequency resource occupied by the one PTCH, where the data transmitted by the PTCH carries indication information used to distinguish uplink triggering from downlink triggering and cyclic redundancy check CRC information; descrambling the CRC information by using a radio network temporary identifier RNTI specific for a cell, a UE, or a group of UEs, so that the UE extracts PTCH information of the received data transmitted by the PTCH in each subframe on the time-frequency resource occupied by the one PTCH indicated by the time-frequency resource configuration information of the PTCH; combining and then decoding the extracted PTCH information, or decoding and then combining the extracted PTCH information; and descrambling the CRC information by using the RNTI specific for a cell, a UE, or a group of UEs, and performing checking by using the descrambled CRC information to obtain the PTCH detection result according to a CRC check result.

A third aspect of the present invention provides a trigger apparatus, which may include:

a first determining module, configured to determine time-frequency resource configuration information of a physical trigger channel PTCH;

a first detecting module, configured to detect one PTCH on a time-frequency resource occupied by the one PTCH indicated by the time-frequency resource configuration information of the PTCH;

a first judging module, configured to determine whether triggering exists according to a PTCH detection result, where the triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data;

a first control module, configured to transmit the first information in the first information subframe or the first information opportunity associated with the PTCH if it is determined that the triggering exists. In a first possible implementation manner of the third aspect, the first determining module is specifically configured to determine the time-frequency resource configuration information of the PTCH according to a preset convention between a base station and a UE; or determine the time-frequency resource configuration information of the PTCH according to one or more types of signaling of radio resource control RRC common signaling, RRC dedicated signaling, media access control MAC control element CE signaling, physical layer signaling, and a random access response RAR.

With reference to the third aspect or the first possible implementation manner of the third aspect, in a second possible implementation manner, the trigger apparatus further includes a second determining module, configured to determine the first information subframe or the first information opportunity associated with the PTCH, where the determining the first information subframe or the first information opportunity associated with the PTCH includes: determining the first information subframe or the first information opportunity associated with the PTCH according to the time-frequency resource configuration information of the PTCH and a preset time offset; or determining the first information subframe or the first information opportunity associated with the PTCH according to the time-frequency resource configuration information of the PTCH and resource configuration information of the first information.

With reference to the second possible implementation manner, in a third possible implementation manner, the trigger apparatus further includes a third determining module, configured to determine the resource configuration information of the first information according to one or more types of signaling of RRC common signaling, RRC dedicated signaling, MAC control element CE signaling, physical layer signaling, and an RAR.

In a fourth possible implementation manner, the trigger apparatus further includes a first receiving module, configured to receive one or more sequences on the time-frequency resource occupied by the one PTCH before the first detecting module detects the PTCH on the time-frequency resource occupied by the one PTCH indicated by the time-frequency resource configuration information of the PTCH.

With reference to the fourth possible implementation manner, in a fifth possible implementation manner, the first detecting module is specifically configured to detect the sequences received on the time-frequency resource occupied by the one PTCH indicated by the time-frequency resource configuration information of the PTCH by using a pre-configured sequence to obtain the PTCH detection result.

With reference to the fifth possible implementation manner, in a sixth possible implementation manner, the trigger apparatus further includes a fourth determining module, configured to determine the pre-configured sequence based on sequence configuration information.

With reference to the sixth possible implementation manner, in a seventh possible implementation manner, the trigger apparatus further includes a fifth determining module, configured to determine the sequence configuration information according to the preset convention between the base station and the UE; or determine the sequence configuration information according to one or more types of signaling of RRC common signaling, RRC dedicated signaling, MAC control element CE signaling, physical layer signaling, and a RAR; or, determining the sequence configuration information according to a random access preamble sent by the UE.

With reference to any one of the fourth to the seventh possible implementation manners of the third aspect, in an eighth possible implementation manner, the first judging module is specifically configured to determine that the triggering exists if the PTCH detection result is greater than or equal to a preset threshold; and determine that no triggering exists if the PTCH detection result is less than the preset threshold.

In a ninth possible implementation manner, the trigger apparatus further includes a second receiving module, configured to receive data transmitted by the PTCH on the time-frequency resource occupied by the one PTCH before the first detecting module detects the PTCH on the time-frequency resource occupied by the one PTCH indicated by the time-frequency resource configuration information of the PTCH, where the data transmitted by the PTCH carries indication information used to distinguish uplink triggering from downlink triggering and cyclic redundancy check CRC information, and the CRC information is scrambled by using a radio network temporary identifier RNTI specific for a cell, a UE, or a group of UEs.

With reference to the ninth possible implementation manner, in a tenth possible implementation manner, the first detecting module is specifically configured to extract PTCH information of the received data transmitted by the PTCH in each subframe on the time-frequency resource occupied by the one PTCH indicated by the time-frequency resource configuration information of the PTCH; combine and then decode the extracted PTCH information, or, decode and then combine the extracted PTCH information; and descramble the CRC information by using the RNTI specific for a cell, a UE, or a group of UEs and perform checking by using the descrambled CRC information and obtain the PTCH detection result according to a CRC check result.

With reference to the ninth or tenth possible implementation manner of the third aspect, in an eleventh possible implementation manner, the first judging module is specifically configured to determine that common triggering exists if the cell CRC information is descrambled by using the cell-specific RNTI and the CRC check result is correct; determine that dedicated triggering exists if the cell CRC information is descrambled by using the UE-specific RNTI and the CRC check result is correct; determine that group triggering exists if the cell CRC information is descrambled by using the RNTI specific for a group of UEs and the CRC check result is correct; and otherwise, determine that no triggering exists.

In a twelfth possible implementation manner, the trigger apparatus further includes a second control module, configured to enter a micro-sleep state if it is determined that no triggering exists until the PTCH is detected on a time-frequency resource occupied by a next PTCH.

A fourth aspect of the present invention provides a trigger apparatus, which may include:

a sixth determining module, configured to determine time-frequency resource configuration information of a physical trigger channel PTCH; and a sending control module, configured to send one PTCH on a time-frequency resource occupied by the one PTCH indicated by the time-frequency resource configuration information of the PTCH, so that a UE detects the sent PTCH on the time-frequency resource occupied by the one PTCH, and determine whether triggering exists according to a PTCH detection result, where the triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data; and the UE transmits the first information in the first information subframe or the first information opportunity associated with the PTCH if it is determined that the triggering exists.

In a first possible implementation manner, the sixth determining module is specifically configured to determine the time-frequency resource configuration information of the PTCH according to a preset convention between a base station and a UE; or preset the time-frequency resource configuration information of the PTCH and send one or more types of signaling of radio resource control RRC common signaling, RRC dedicated signaling, media access control MAC control element CE signaling, physical layer signaling, and a random access response RAR, where the one or more types of signaling include the time-frequency resource configuration information of the PTCH. With reference to the fourth aspect or the first possible implementation manner of the fourth aspect, in a second possible implementation manner, the trigger apparatus further includes a seventh determining module, configured to detect the first information subframe or the first information opportunity associated with the PTCH, where the determining the first information subframe or the first information opportunity associated with the PTCH includes: determining the first information subframe or the first information opportunity associated with the PTCH according to the time-frequency resource configuration information of the PTCH and a preset time offset; or determining the first information subframe or the first information opportunity associated with the PTCH according to the time-frequency resource configuration information of the PTCH and resource configuration information of the first information.

With reference to the second possible implementation manner, in a third possible implementation manner, the apparatus further includes a setting module, configured to preset the resource configuration information of the first information; and the trigger apparatus further includes a first sending module, configured to send one or more types of signaling of RRC common signaling, RRC dedicated signaling, MAC control element CE signaling, physical layer signaling, and a RAR, where the one or more types of signaling include the resource configuration information of the first information. In a fourth possible implementation manner, the sending control module is specifically configured to send one or more sequences on the time-frequency resource occupied by the one PTCH, so that the UE detects the received sequences on the time-frequency resource occupied by the one PTCH indicated by the time-frequency resource configuration information of the PTCH by using a pre-configured sequence and obtains the PTCH detection result.

With reference to the fourth possible implementation manner, in a fifth possible implementation manner, the trigger apparatus further includes an eighth determining module, configured to detect the pre-configured sequence based on sequence configuration information.

With reference to the fifth possible implementation manner, in a sixth possible implementation manner, the trigger apparatus further includes a ninth determining module, configured to determine the sequence configuration information according to the preset convention between the base station and the UE; or, preset the sequence configuration information and send one or more types of signaling of RRC common signaling, RRC dedicated signaling, MAC control element CE signaling, physical layer signaling, and a random access response RAR; or, determine the sequence configuration information according to a random access preamble sent by the UE.

In a seventh possible implementation manner, the sending control module is specifically configured to send data transmitted by the PTCH on the time-frequency resource occupied by the one PTCH, where the data transmitted by the PTCH carries indication information used to distinguish uplink triggering from downlink triggering and cyclic redundancy check CRC information; scramble the CRC information by using a radio network temporary identifier RNTI specific for a cell, a UE, or a group of UEs, so that the PTCH information of the received data transmitted by the PTCH is extracted on the time-frequency resource occupied by the one PTCH indicated by the time-frequency resource configuration information of the PTCH by the UE; combine and then decode the extracted PTCH information, or decode and then combine the extracted PTCH information; and descramble the CRC information by using the RNTI specific for a cell, a UE, or a group of UEs, and perform the checking by using the descrambled CRC information and obtain the PTCH detection result according to a CRC check result.

A fifth aspect of the present invention provides a trigger apparatus, which may include an input apparatus, an output apparatus, and a first processor, where the first processor executes the following steps:

determine time-frequency resource configuration information of a physical trigger channel PTCH; detect one PTCH on a time-frequency resource occupied by the one PTCH indicated by the time-frequency resource configuration information of the PTCH; determine whether triggering exists according to a PTCH detection result, where the triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data; and if it is determined that the triggering exists, transmit the first information in the first information subframe or the first information opportunity associated with the PTCH.

In a first possible implementation manner, the first processor further executes the following steps: determine the time-frequency resource configuration information of the PTCH according to a preset convention between a base station and a UE; or determine the time-frequency resource configuration information of the PTCH according to one or more types of signaling of radio resource control RRC common signaling, RRC dedicated signaling, media access control MAC control element CE signaling, physical layer signaling, and a random access response RAR.

With reference to the fifth aspect or the first possible implementation manner of the fifth aspect, in a second possible implementation manner, the first processor further executes the following steps: determine the first information subframe or the first information opportunity associated with the PTCH according to the time-frequency resource configuration information of the PTCH and a preset time offset; or determine the first information subframe or the first information opportunity associated with the PTCH according to the time-frequency resource configuration information of the PTCH and resource configuration information of the first information.

With reference to the second possible implementation manner, in a third possible implementation manner, the first processor further executes the following step: determine the resource configuration information of the first information according to one or more types of signaling of RRC common signaling, RRC dedicated signaling, MAC control element CE signaling, physical layer signaling, and an RAR.

In a fourth possible implementation manner, the first processor specifically executes the following steps: determine the time-frequency resource configuration information of the PTCH; receive one or more sequences on the time-frequency resource occupied by the one PTCH; detect the received sequences on the time-frequency resource occupied by the one PTCH indicated by the time-frequency resource configuration information of the PTCH by using a pre-configured sequence to obtain the PTCH detection result; determine that the triggering exists when the PTCH detection result is greater than or equal to a preset threshold; and otherwise, determining that no triggering exists.

In a fifth possible implementation manner, the first processor specifically executes the following steps: determine the time-frequency resource configuration information of the PTCH; receive data transmitted by the PTCH on the time-frequency resource occupied by the one PTCH, where the data transmitted by the PTCH carries indication information used to distinguish uplink triggering from downlink triggering and cyclic redundancy check CRC information; scramble the CRC information by using a radio network temporary identifier RNTI specific for a cell, a UE, or a group of UEs; extract PTCH information of the received data transmitted by the PTCH in each subframe on the time-frequency resource occupied by the one PTCH indicated by the time-frequency resource configuration information of the PTCH; combine and then decode the extracted PTCH information, or decode and then combine the extracted PTCH information; descramble the CRC information by using the RNTI specific for a cell, a UE, or a group of UEs, and perform checking by using the descrambled CRC information and obtain the PTCH detection result according to a CRC check result; determine that common triggering exists if the cell CRC information is descrambled by using the cell-specific RNTI and the CRC check result is correct; determine that dedicated triggering exists if the cell CRC information is descrambled by using the UE-specific RNTI and the CRC check result is correct; determine that group triggering exists if the cell CRC information is descrambled by using an RNTI specific for a group of UEs and the CRC check result is correct; and otherwise, determine that no triggering exists.

In a sixth possible implementation manner, the first processor further executes the following step: enter a micro-sleep state if it is determined that no triggering exists until the PTCH is detected on a time-frequency resource occupied by a next PTCH.

In a sixth aspect, the present invention provides a trigger apparatus, which may include: an input apparatus, an output apparatus, and a second processor, where the second processor executes the following steps:

determine time-frequency resource configuration information of a physical trigger channel PTCH; and send one PTCH on a time-frequency resource occupied by the one PTCH indicated by the time-frequency resource configuration information of the PTCH, so that a UE detects the sent PTCH on the time-frequency resource occupied by the one PTCH and determines whether triggering exists according to a PTCH detection result, where the triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data; and if it is determined that the triggering exists, transmits the first information in the first information subframe or the first information opportunity associated with the PTCH.

In a first possible implementation manner, the second processor further executes the following steps: determine the time-frequency resource configuration information of the PTCH according to a preset convention between a base station and the UE; or preset the time-frequency resource configuration information of the PTCH and send one or more types of signaling of radio resource control RRC common signaling, RRC dedicated signaling, media access control MAC control element CE signaling, physical layer signaling, and a random access response RAR, where the one or more types of signaling include the time-frequency resource configuration information of the PTCH.

With reference to the sixth aspect or the first possible implementation manner of the sixth aspect, in a second possible implementation manner, the second processor further executes the following steps: determine the first information subframe or the first information opportunity associated with the PTCH according to the time-frequency resource configuration information of the PTCH and a preset time offset; or determine the first information subframe or the first information opportunity associated with the PTCH according to the time-frequency resource configuration information of the PTCH and resource configuration information of the first information.

With reference to the second possible implementation manner, in a third possible implementation manner, the second processor further executes the following steps: preset the resource configuration information of the first information and send one or more types of signaling of RRC common signaling, RRC dedicated signaling, MAC control element CE signaling, physical layer signaling, and an RAR, where the one or more types of signaling include the resource configuration information of the first information.

In a fourth possible implementation manner, the second processor specifically executes the following steps: determine the time-frequency resource configuration information of the PTCH; and send one or more sequences on the time-frequency resource occupied by the one PTCH, so that the UE detects the received sequences on the time-frequency resource occupied by the one PTCH indicated by the time-frequency resource configuration information of the PTCH by using a pre-configured sequence to obtain the PTCH detection result.

In a fifth possible implementation manner, the second processor specifically executes the following steps: determine the time-frequency resource configuration information of the PTCH; send data transmitted by the PTCH on the time-frequency resource occupied by the one PTCH, where the data transmitted by the PTCH carries indication information used to distinguish uplink triggering from downlink triggering and cyclic redundancy check CRC information, and the CRC information is scrambled by using a radio network temporary identifier RNTI specific for a cell, a UE, or a group of UEs, so that the UE extracts PTCH information of the received data transmitted by the PTCH in each subframe on the time-frequency resource occupied by the one PTCH indicated by the time-frequency resource configuration information of the PTCH; combine and then decode the extracted PTCH information, or decode and then combine the extracted PTCH information; descramble the CRC information by using the RNTI specific for a cell, a UE, or a group of UEs, and perform checking by using the descrambled CRC information to obtain the PTCH detection result according to a CRC check result. It can be seen from the foregoing technical solutions that according to the trigger method and related apparatus provided by the embodiments of the present invention, by detecting one PTCH on a time-frequency resource occupied by the one PTCH indicated by time-frequency resource configuration information of the PTCH, first information is transmitted if it is determined that triggering used to indicate that the first information needs to be transmitted in a first information subframe or a first information opportunity associated with the PTCH exists, so that a user equipment (such as an MTC UE) is prevented from performing unnecessary detection on a PDCCH or an ePDCCH when no DCI of the user equipment exists, thereby achieving the purpose of saving the user equipment power.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Embodiments of the present invention provide a trigger method and related apparatus, used to prevent a UE from performing unnecessary detection on a PDCCH or an ePDCCH, thereby achieving the purpose of saving UE power.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

All embodiments are respectively described in detail below.

Embodiment 1

Figure 1:
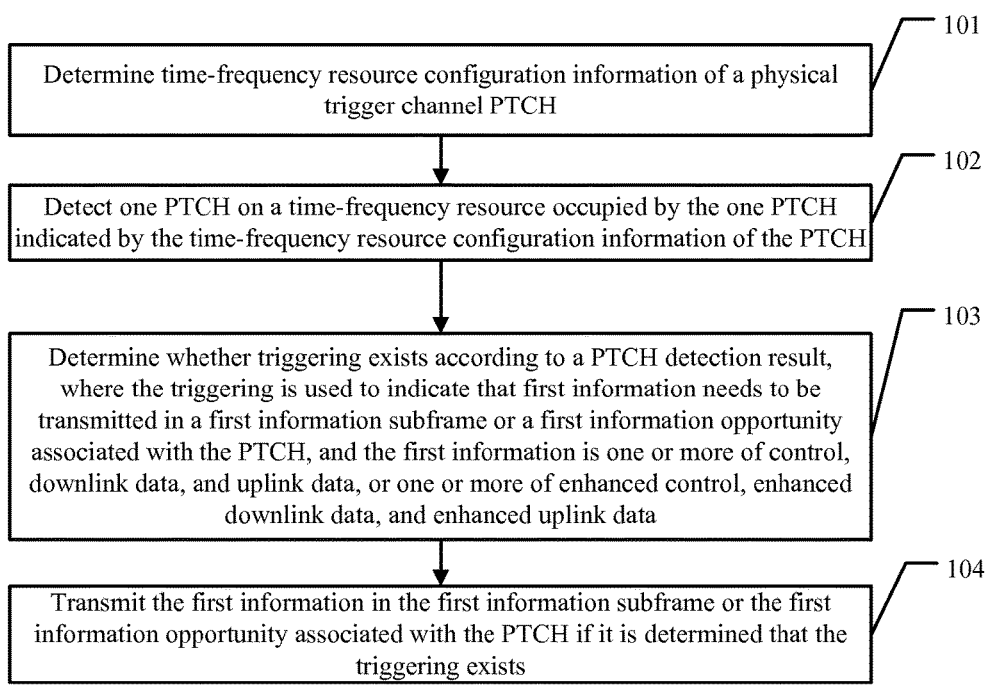
FIG. 1 is a flowchart of a trigger method according to an embodiment of the present invention.

Referring to FIG. 1, FIG. 1 is a flowchart of a trigger method provided by the embodiment of the present invention, where the method includes:

S101. Determine time-frequency resource configuration information of a physical trigger channel PTCH.

It can be understood that the method may be executed by a user equipment UE (such as an MTC UE), or another sending and receiving trigger apparatus, which is not specifically limited herein.

The physical trigger channel (PTCH) is used to trigger the UE or another sending and receiving trigger apparatus. The time-frequency resource configuration information of the PTCH includes one or more of the following: a start frame number PTCH-StartFrame of the PTCH, at least one subframe number PTCH-StartSubframe, at least one time slot serial number PTCH-StartSlot, at least one symbol serial number PTCH-StartSymbol, a period, the number of subframes occupied by the PTCH SubframeLength, a serial number FirstPRBNumber of a first physical resource block (PRB) occupied by the PTCH, the number of PRBs occupied by the PTCH PRBNumber, a serial number FirstSubCarrierNumber of a first subcarrier occupied by the PTCH, the number of subcarriers occupied by the PTCH SubCarrierNumber, and power configuration PTCH-Power adopted by PTCH transmission, where the period is a time interval between two PTCHs.

S102. Detect one PTCH on a time-frequency resource occupied by the one PTCH indicated by the time-frequency resource configuration information of the PTCH.

It should be noted that the time-frequency resource in the present invention includes a time domain resource and a frequency domain resource, where the time domain resource may be formed by using a frame, a subframe, a time slot, or a symbol as a granularity, and the frequency domain resource may be formed by using a PRB or a subcarrier as a granularity.

S103. Determine whether triggering exists according to a PTCH detection result.

The triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data. The first information transmission includes: receiving the first information or sending the first information. One first information transmission may occupy one or more subframes, and the occupied one or more subframes are indicated by the first information subframe or the first information opportunity.

S104. Transmit the first information in the first information subframe or the first information opportunity associated with the PTCH if it is determined that the triggering exists.

It should be noted that the triggering may include downlink triggering and uplink triggering in the embodiment of the present invention.

In downlink triggering, the control is a control channel including downlink control information, for example, the control may be a PDCCH. Downlink data is a data channel including a system information block (SIB), a downlink multicast message, or a downlink unicast message; for example, the downlink data may be a physical downlink shared channel (PDSCH), where the downlink multicast messages include one or more of the following: a paging message paging, a random access response (RAR) message, and a contention resolution message scrambled by using a temporary cell radio network temporary identifier Temporary C-RNTI. When the downlink data is a data channel including an SIB or a downlink multicast message, the control is a control channel used to include an SIB or downlink multicast message control information; and when the downlink multicast message is a paging message paging, the downlink triggering is called downlink common triggering; when the downlink data is a data channel used to include a downlink unicast message, and the control is a control channel used to include the downlink unicast message control information, the downlink triggering is called downlink dedicated triggering; and when the downlink data is a data channel used to include the downlink multicast message, the control is a control channel used to include the downlink multicast message control information and the downlink multicast message is a RAR or a contention resolution message scrambled by using a Temporary C-RNTI, the downlink triggering is called downlink group triggering.

In uplink triggering, the control is a control channel used to include uplink control information, for example, the control may be a PDCCH, the uplink data is a data channel including an uplink message; for example, the uplink data may be a physical uplink shared channel (PUSCH). The uplink triggering is used to indicate that uplink data or enhanced uplink data needs to be transmitted in an uplink data subframe or an enhanced uplink data opportunity associated with the PTCH, where in a case in which the uplink data is the data channel including the uplink message, when the uplink message is a third step message in a random access process, the uplink triggering is called uplink group triggering, and the uplink triggering is called uplink dedicated triggering in other cases.

It can be known from the above that according to the trigger method provided by the embodiment of the present invention, by detecting the PTCH on the time-frequency resource occupied by the one PTCH indicated by the time-frequency resource configuration information of the PTCH, first information is transmitted if it is determined that the triggering used to indicate that the first information needs to be transmitted in the first information subframe or the first information opportunity associated with the PTCH exists, so that the user equipment (such as the MTC UE) is prevented from performing unnecessary detection on the PDCCH or ePDCCH when no DCI of the user equipment exists, thereby achieving the purpose of saving user equipment power.

Further, the solution of the embodiment of the present invention can be applied to a case in which a base station may not send a physical control format indicator channel (PCFICH) and a PDCCH (an ePDCCH) to a user equipment. On this occasion, the UE needs to perform detection on a PDSCH regardless of existence of the downlink data of the UE on a time-frequency resource of the PDSCH, and such detection is unnecessary when no downlink data of the UE exists and a power waste is caused. In addition, the base station reserves fixed time-frequency resource in advance for the UE to send the PUSCH regardless of existence of the uplink data in the UE, a resource waste is caused if a fixed PUSCH time-frequency resource is reserved for each UE, and the detection performance of the base station for the PUSCH may be reduced if partial UEs are allowed to send competitive PUSCH on the same reserved time-frequency resource. According to the trigger method provided by the embodiment of the present invention, by detecting one PTCH on the time-frequency resource occupied by the one PTCH indicated by the time-frequency resource configuration information of the PTCH, the first information is transmitted if it is determined that the triggering used to indicate that the first information needs to be transmitted in the first information subframe or the first information opportunity associated with the PTCH exists, so that the user equipment (such as the MTC UE) is prevented from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs uplink triggering (authorization) for the user equipment; therefore, the problem caused by reservation of the time-frequency resource on the PUSCH is avoided.

Embodiment 2

Figure 2:
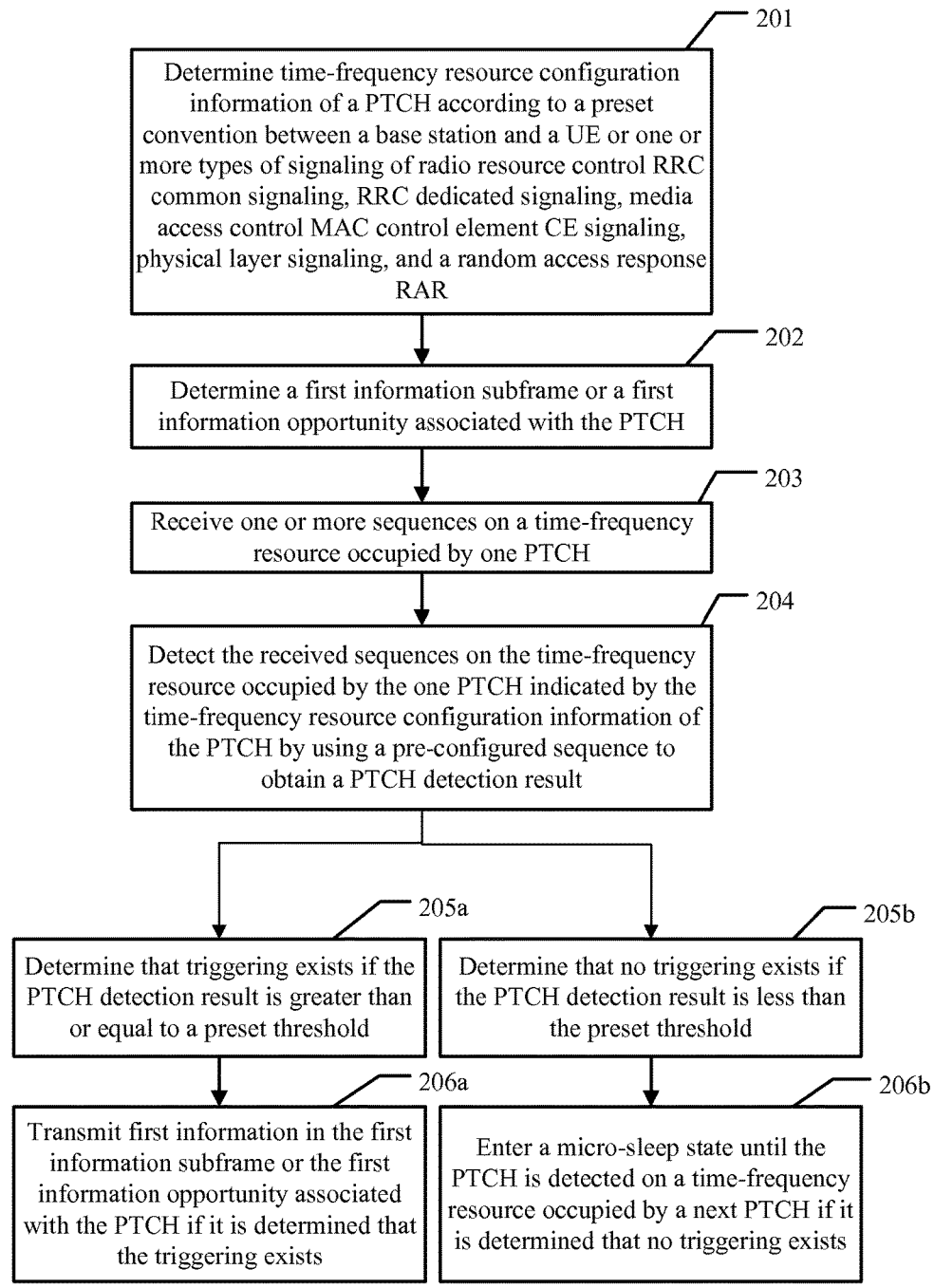
FIG. 2 is another flowchart of a trigger method according to an embodiment of the present invention.

Referring to FIG. 2, FIG. 2 is another flowchart of a trigger method provided by the embodiment of the present invention. The trigger method provided by the embodiment of the present invention is described by using a UE as an execution body in the embodiment below, where on the basis that time-frequency resource configuration information of a PTCH may be determined in a plurality of manners, the method includes:

S201. Determine the time-frequency resource configuration information of the PTCH according to a preset convention between a base station and a UE, or according to one or more types of signaling of radio resource control RRC common signaling, RRC dedicated signaling, media access control MAC control element CE signaling, physical layer signaling, and a random access response RAR;

where the full name of radio resource control RRC is Radio Resource Control; the full name of the media access control MAC is Media Access Control, the full name of the control element CE is Control Element, and the full name of the random access response RAR is Random Access Response.

S202. Determine a first information subframe or a first information opportunity associated with the PTCH.

In some implementation manners, the first information subframe or the first information opportunity associated with the PTCH is determined according to the time-frequency resource configuration information of the PTCH and a preset time offset; or the first information subframe or the first information opportunity associated with the PTCH is determined according to the time-frequency resource configuration information of the PTCH and resource configuration information of first information.

The resource configuration information of the first information includes one or more of the following: a start frame number of first information transmission, at least one subframe number, at least one time slot serial number, at least one symbol serial number, a period, the number of subframes occupied by the first information transmission, a serial number of a first physical resource block PRB occupied by the first information transmission, the number of PRBs occupied by the first information transmission, a serial number of a first subcarrier occupied by the first information transmission, the number of subcarriers occupied by the first information transmission, and power configuration adopted by the first information transmission, where the period is a time interval between two first information transmissions.

It can be understood that before the determining a first information subframe or a first information opportunity associated with the PTCH (S202), the method may further include: determining the resource configuration information of the first information according to one or more types of signaling of RRC common signaling, RRC dedicated signaling, MAC control element CE signaling, physical layer signaling, and a random access response RAR.

It should be noted that one PTCH may be associated with one or more first information subframes or first information opportunities.

For example, assuming that the start frame number of the PTCH is 0, the subframe numbers are 0, the number of the subframe occupied by the PTCH is 1, the period of the PTCH is 5 milliseconds, and the preset time offset is 2 milliseconds in the time-frequency resource configuration information of the PTCH, the first information subframe or the first information opportunity associated with the PTCH is determined according to the time-frequency resource configuration information of the PTCH and the preset time offset. One PTCH is associated with one first information subframe or one first information opportunity. One first information transmission indicated by the first information subframe or the first information opportunity associated with the PTCH in subframe 0 may occupy one subframe, that is, subframe 2. One first information transmission indicated by the first information subframe or the first information opportunity associated with the PTCH in subframe 5 may occupy one subframe, that is, subframe 7.

For another example, assuming that the start frame number of the PTCH is 0, the subframe numbers are 0, the number of the subframe occupied by the PTCH is 1, and the period of the PTCH is 5 milliseconds in the time-frequency resource configuration information of the PTCH, and further assuming that the start frame number of the first information transmission is 0, the subframe numbers are 0, the transmission period of the first information is 1 millisecond, and the number of the subframe occupied by one first information transmission is 1 in the resource configuration information of the first information, the first information subframe or the first information opportunity associated with the PTCH is determined according to the time-frequency resource configuration information of the PTCH and the resource configuration information of the first information. One PTCH is associated with a plurality of first information subframes or first information opportunities. One subframe, that is, subframe 0, 1, 2, 3 or 4 may be occupied in one first information transmission indicated by the plurality of first information subframes or first information opportunities associated with the PTCH in subframe 0. One subframe, that is, subframe 5, 6, 7, 8 or 9 may be occupied in one first information transmission indicated by the plurality of first information subframes or first information opportunities associated with the PTCH in subframe 5. S203. Receive one or more sequences on the time-frequency resource occupied by one PTCH.

It can be understood that the time-domain and frequency-domain resources occupied by one PTCH may be exclusively owned by one UE or shared by one group of UEs. In some implementation manners, on the time-frequency resource occupied by one PTCH, the system or base station may send one or more sequences for triggering one or more UEs, and the UEs receive one or more sequences on the time-frequency resource occupied by the one PTCH;

where the sequences shall have excellent self-correlation property and cross-correlation property. These sequences may be sequences with a zero-correlation zone or low-correlation zone property, or Gold sequences, or m sequences, or sequences generated by a computer, and the like. These sequences may also be generated by one or more root sequences by using different cyclic shifts.

S204. Detect the sequences received on the time-frequency resource occupied by the one PTCH indicated by the time-frequency resource configuration information of the PTCH by using a pre-configured sequence to obtain the PTCH detection result.

The pre-configured sequence may be determined based on sequence configuration information, the sequence configuration information includes one or more of the following information: index indication information SequenceIndex of the sequences, length indication information SequenceLength of the sequences, index indication information RootSequenceIndex of a root sequence for generating the sequences; and length indication information RootSequenceLength of the root sequence.

It can be understood that before determining the pre-configured sequence according to the sequence configuration information, the method may further include a step of determining the sequence configuration information, where in some implementation manners, the sequence configuration information may be determined in the following manner:

determining the sequence configuration information according to the preset convention between the base station and the UEs; or, determining the sequence configuration information according to one or more types of signaling of RRC common signaling, RRC dedicated signaling, MAC control element CE signaling, physical layer signaling, and an RAR; or, determining the sequence configuration information according to a random access preamble sent by the UEs, Then, step S205a or step S205b is triggered according to the obtained detection result S205a. Determine that triggering exists if the PTCH detection result is greater than or equal to a preset threshold;

and execute step S206a.

S205b. Determine that no triggering exists if the PTCH detection result is less than the preset threshold;

and execute step S206b.

S206a. Transmit the first information in the first information subframe or the first information opportunity associated with the PTCH if it is determined that the triggering exists.

S206b. Enter a micro-sleep state until the PTCH is detected on a time-frequency resource occupied by a next PTCH if it is determined that no triggering exists.

The trigger method (S201-S206a/S206b) provided by the embodiment is described in detail by using specific scenarios as examples below, where the UEs and the base station interact in the specific scenarios, and the PTCH is detected on the time-frequency resource occupied by the one PTCH indicated by the determined time-frequency resource configuration information of the PTCH:

When the PTCH is used for downlink common triggering, the time-frequency resource configuration information of the PTCH and/or the sequence configuration information may be pre-determined by the base station and the UEs, or the base station informs the UEs of the time-frequency resource configuration information of the PTCH and/or the sequence configuration information by using the RRC common signaling (such as system information block SIB or master information block (MIB, Master Information Block)). For specific information included in the time-frequency resource configuration information and the sequence configuration information of the PTCH, reference may be made to the foregoing content. For example, the RRC common signaling RadioResourceConfigCommon may include the following information elements (IE, Information Element):

```
RadioResourceConfigCommon ::= SEQUENCE {
PTCH-ConfigCommon        PTCH-configCommon,
}
PTCH-ConfigCommon ::= SEQUENCE {
PTCH-StartFrame          INTEGER{0,1,...1023},
PTCH-StartSubframe       INTEGER{0,1,...9},
PTCH-StartSlot           INTEGER{0,1,...20},
PTCH-StartSymbol         INTEGER{0,1,...14},
Period                   ENUMERATED{ t1, t2, ....},
SubframeLength           ENUMERATED { x1, x2, ....},
FirstPRBNumber           ENUMERATED { y1, y2, ....},
PRBNumber                ENUMERATED { z1, z2, ....},
PTCH-Power               ENUMERATED { p1, p2, ....},
SequenceIndex            ENUMERATED { s1, s2, ....},
SequenceLength           ENUMERATED { l1, l2, ....},
}
```

When the PTCH is used for downlink group triggering and/or uplink group triggering, the time-frequency resource configuration information and the sequence configuration information of the PTCH may be as follows:

(1) time-frequency resource configuration information of the PTCH and/or sequence configuration information, pre-determined by the base station and the UEs; or, (2) time-frequency resource configuration information of the PTCH, of which the UEs are informed by the base station by using the RRC common signaling (such as system information block SIB or master information block (MIB, Master Information Block), and sequence configuration information adopted by the PTCH, determined according to the random access preamble sent by the UEs; or, (3) time-frequency resource configuration information of the PTCH, pre-determined by the base station and the UEs, and sequence configuration information adopted by the PTCH, determined according to the random access preamble sent by the UEs; or, (4) time-frequency resource configuration information of the PTCH, included in the random access response message RAR sent by the base station, sequence configuration information adopted by the PTCH, determined according to the random access preamble sent by the UEs; or, (5) time-frequency resource configuration information of the PTCH and/or sequence configuration information adopted by the PTCH, included in the random access response message RAR by the base station.

When the PTCH is used for downlink dedicated triggering and/or uplink dedicated triggering, the time-frequency resource configuration information of the PTCH and/or the sequence configuration information may be pre-determined by the base station and the UEs, or the base station informs the UEs of the time-frequency resource configuration information of the PTCH and/or the sequence configuration information by using one or more types of signaling of radio link control RRC dedicated signaling, media access control MAC control element CE signaling, and physical layer signaling. For specific information included in the time-frequency resource configuration information of the PTCH and/or the sequence configuration information, reference may be made to the foregoing content. For example, the RRC dedicated signaling RadioResourceConfigDedicated may include the following IEs:

```
RadioResourceConfigDedicated ::= SEQUENCE {
PTCH-ConfigDedicate      PTCH-configDedicated,
}
PTCH-ConfigDedicated ::= SEQUENCE {
PTCH-StartFrame          INTEGER{0,1,...1023},
PTCH-StartSubframe       INTEGER{0,1,...9},
PTCH-StartSlot           INTEGER{0,1,...20},
PTCH-StartSymbol         INTEGER{0,1,...14},
Period                   ENUMERATED { t1, t2, ....},
SubframeLength           ENUMERATED { x1, x2, ....},
FirstPRBNumber           ENUMERATED { y1, y2, ....},
PRBNumber                ENUMERATED { z1, z2, ....},
PTCH-Power               ENUMERATED { p1, p2, ....},
SequenceIndex1           ENUMERATED { s1, s2, ....},
SequenceIndex2           ENUMERATED { s1, s2, ....},
SequenceLength1          ENUMERATED { l1, l2, ....},
SequenceLength2          ENUMERATED { l1, l2, ....},
}.
```

It should be noted that the time-frequency resource configuration information of the PTCH and/or the sequence configuration information, of which the UEs are informed by the base station by using the one or more types of signaling of RRC dedicated signaling, MAC control element CE signaling, and physical layer signaling, may be further used for one or more of the following: downlink common triggering, downlink group triggering, and uplink group triggering. Therefore, when the PTCH is used for one or more of the following: downlink common triggering, downlink group triggering, and uplink group triggering, the base station does not need to configure the time-frequency resource configuration information of the PTCH and/or the sequence configuration information.

The base station may configure time-frequency resource configuration information of one PTCH and one pre-configured sequence for a same UE, and the UE may determine whether the triggering exists through correlation detection of the sequence. The time-frequency resource configuration information of the one PTCH and the one pre-configured sequence may be shared by a plurality of UEs, and used to trigger different UEs. The base station may configure time-frequency resource configuration information of a plurality of different PTCHs for the same UE, and the UE detects different types of triggering through correlation detection on time-frequency resources occupied by the PTCHs indicated by the time-frequency resource configuration information of the different PTCHs. The base station may configure a plurality of pre-configured sequences for the same UE, and the UE detects different types of triggering through the different pre-configured sequences. In addition, the base station may further send a same sequence on the time-frequency resources occupied by the PTCHs indicated by the time-frequency resource configuration information of the different PTCHs for triggering different UEs, and the base station may further send different sequences on the time-frequency resources occupied by the PTCHs indicated by the time-frequency resource configuration information of a same PTCH for triggering different UEs.

Each UE performs correlation detection for the received sequences on the time-frequency resource occupied by one PTCH in the time-frequency resource configuration information of the PTCH configured for the UE by using its own pre-configured sequence and detecting whether its own triggering exists on the time-frequency resource occupied by the PTCH according to a result of correlation detection. When the UE does not detect any triggering on the time-frequency resource occupied by the one PTCH, the UE enters a micro-sleep state until the PTCH is detected on a time-frequency resource occupied by a next PTCH.

In some implementation manners, for example, one PTCH includes SubframeLength subframes, if a sequence pre-configured for the UE by the base station is a long sequence, for example, length indication information of the sequence or length indication information of a root sequence in the sequence configuration information is used to indicate that the pre-configured sequence is a long sequence, the base station sends one long sequence in the SubframeLength subframes, and the UE performs correlation detection for the received sequences in the SubframeLength subframes by using its own pre-configured long sequence, where the correlation detection means that assuming that the received sequence is $r_1, r_2, \ldots, r_L$, where L is a sequence length, one sequence in the pre-configured sequence allocated to the UE by the base station is $c_1, c_2, \ldots, c_L$, the UE makes a correlation operation $$\sum_{i=1}^{L} |r_i c_i^*| = \text{metric of the sequence.}$$

If a value of metric is greater than or equal to a fixed threshold value, the UE determines that its own triggering exists on the PTCH, and if the value of metric is less than the fixed threshold value, the UE determines that its own triggering does not exist on the PTCH.

If the sequence pre-configured for the UE by the base station is a short sequence, for example, length indication information of the sequence or the length indication information of the root sequence in the sequence configuration information is used to indicate that the pre-configuration sequence is a short sequence, the base station sends the short sequence in N (N is a positive integer) subframes, the short sequence is sent for M times in SubframeLength subframes, including M−1 times of repeated sending (SubframeLength=N*M, M is a positive integer); the UE is used to perform correlation detection on the received sequence that is sent for M times by using the pre-configured short sequence allocated to the UE, where the correlation detection includes: assuming that the sequence received in the SubframeLength subframes is $r_{11}, r_{12}, \ldots, r_{L1}, r_{12}, r_{22}, \ldots, r_{L2}, \ldots, r_{1M}, r_{2M}, \ldots, r_{LM}$, where L is a length of the short sequence, one of pre-configured short sequences allocated to the UE by the base station is $c_1, c_2, \ldots, c_L$, the UE firstly combines the sequences received in the SubframeLength subframes and then performs correlation operation of the sequences on a result after combination by using the pre-configured short sequences allocated to the UE, that is $$\sum_{i=1}^{L} \left| \left( \sum_{j=1}^{M} r_{ij} \right) c_i^* \right| = \text{metric;}$$

or, the UE firstly performs correlation operation of the sequence sent for M times and received in the SubframeLength subframes by using the pre-configured short sequences allocated to the UE respectively, and then superpositions results of correlation operation, that is $$\sum_{j=1}^{M} \left( \sum_{i=1}^{L} |r_{ij} c_i^*| \right) = \text{metric.}$$

If a value of metric is greater than or equal to a fixed threshold value, the UE determines that its own triggering exists on the PTCH, and if the value of metric is less than the fixed threshold value, the UE determines that its own triggering does not exist on the PTCH.

In some implementation manners, a plurality of pre-configured sequences may be configured for a same UE, for example, two pre-configured sequences are configured for the UE, and are respectively used for uplink triggering and downlink triggering of the PTCH. The UE only needs to perform correlation detection on the received sequence configured for the UE on the time-frequency resource occupied by the PTCH indicated by the time-frequency resource configuration information of the PTCH by using the two pre-configured sequences, and then the UE may determine whether its own uplink triggering and downlink triggering exist according to a detection result and the pre-configured sequences adopted by the correlation detection.

It can be known from the above that according to the trigger method provided by the embodiment of the present invention, by detecting the PTCH on the time-frequency resource occupied by the one PTCH indicated by the time-frequency resource configuration information of the PTCH, the first information is transmitted only if it is determined that the triggering used to indicate that the first information needs to be transmitted in the first information subframe or the first information opportunity associated with the PTCH exists, so that the user equipment (such as an MTC UE) is prevented from performing unnecessary detection on the PDCCH or ePDCCH when no DCI of the user equipment exists, thereby achieving the purpose of saving user equipment power. Further, the solution of the embodiment of the present invention can be applied to a case in which the base station does not send the PCFICH or PDCCH (ePDCCH) to the user equipment so as to prevent the user equipment (such as the MTC UE) from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs uplink triggering (authorization) on the user equipment; therefore, the problem caused by reservation of the time-frequency resource on the PUSCH is avoided.

Embodiment 3

Figure 3:
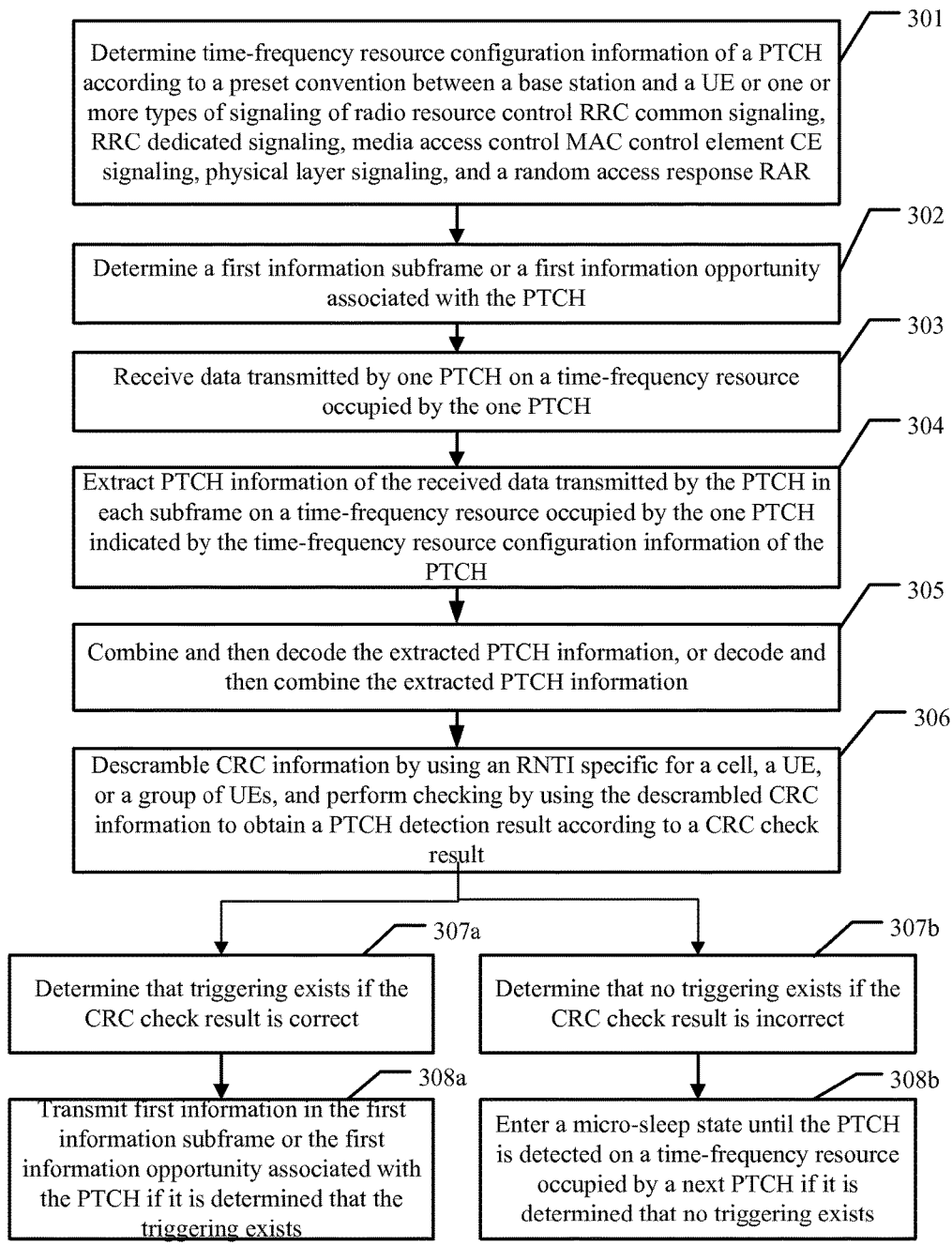
FIG. 3 is another flowchart of a trigger method according to an embodiment of the present invention.

Referring to FIG. 3, FIG. 3 is another flowchart of a trigger method provided by the embodiment of the present invention. The method (taking a UE as an execution body for example) includes:

S301. Determine time-frequency resource configuration information of a PTCH according to a preset convention between a base station and a UE or according to one or more types of signaling of radio resource control RRC common signaling, RRC dedicated signaling, media access control MAC control element CE signaling, physical layer signaling, and a random access response RAR.

S302. Determine a first information subframe or a first information opportunity associated with the PTCH.

It can be understood that for S301 and S302, reference may be made to the relevant content description of the foregoing steps S201 and S202, which are not specifically described herein.

S303. Receive data transmitted by one PTCH on a time-frequency resource occupied by the one PTCH.

The data transmitted by the PTCH carries indication information used to distinguish uplink triggering from downlink triggering and cyclic redundancy check (CRC) information, where the CRC information is scrambled by using a cell-specific, UE-specific, or a radio network temporary identifier specific for a group of UEs (RNTI Radio Network Temporary Identifier).

The cell-specific RNTI is one of a system information radio network temporary identifier SI-RNTI and a paging radio network temporary identifier P-RNTI, the UE-specific RNTI is one of a cell radio network temporary identifier C-RNTI, a semi-persistent scheduling radio network temporary identifier SPS C-RNTI, a transmission power control physical uplink control channel radio network temporary identifier TPC-PUCCH-RNTI, and a transmission power control physical uplink shared channel radio network temporary identifier TPC-PUSCH-RNTI, and an RNTI specific for a group of UEs is one of a random access radio network temporary identifier RA-RNTI and a temporary cell radio network temporary identifier Temporary C-RNTI.

It can be understood that information borne by the data transmitted by the PTCH can be understood as follows: 16-bit CRC information (the bit number of CRC may also be another value, and the embodiment is described by using the bit number of 16 as an example) is added behind 1-bit indication information, and in this embodiment, when the 1-bit indication information is 0, it may indicate that the PTCH is used for uplink triggering; when the 1-bit indication information is 1, it may indicate that the PTCH is used for downlink triggering, where the downlink triggering may include downlink common triggering, downlink group triggering, and downlink dedicated triggering; and the uplink triggering may include uplink group triggering and uplink dedicated triggering. Definitions of different types of triggering may be the same as those described in Embodiment 1, which are not specifically described herein.

When the 1-bit indication information is 0 and the PTCH is used for uplink dedicated triggering, the 16-bit CRC information is scrambled by using one of the C-RNTI, the SPS C-RNTI, the TPC-PUCCH-RNTI, and the TPC-PUSCH-RNTI; when the 1-bit indication information is 0 and the PTCH is used for uplink group triggering, the 16-bit CRC information is scrambled by using the Temporary C-RNTI; when the 1-bit indication information is 1 and the PTCH is used for downlink common triggering, the 16-bit CRC information is scrambled by using the SI-RNTI or P-RNTI; when the 1-bit indication information is 1 and the PTCH is used for downlink group triggering, the 16-bit CRC information is scrambled by using the Temporary C-RNTI or RA-RNTI; and when the 1-bit indication information is 1 and the PTCH is used for downlink dedicated triggering, the 16-bit CRC information is scrambled by using the C-RNTI or SPS C-RNTI. Optionally, the 16-bit CRC information may further be scrambled by using a radio network temporary identifier specific for a group of UEs, which is used to trigger one group of different UEs. For example, the 16-bit CRC information may be scrambled by using a group radio network temporary identifier G-RNTI, where a value of the G-RNTI may be obtained according to a subscription message (such as IMSI) and/or equipment information (such as IMEI) according to a preset rule, such as G-RNTI=(IMSI) mod(X), where X is a fixed value and mod( ) is a modulo operation.

S304. Extract PTCH information of the received data transmitted by the PTCH in each subframe on the time-frequency resource occupied by the one PTCH indicated by the time-frequency resource configuration information of the PTCH.

S305. Combine and then decode the extracted PTCH information, or decode and then combine the extracted PTCH information.

S306. Descramble the CRC information by using the RNTI specific for a cell, a UE, or a group of UEs and perform checking by using the descrambled CRC information and obtain the PTCH detection result according to a CRC check result;

and then, trigger step S307a or S307b according to the obtained PTCH detection result, S307a. Determine that triggering exists if the CRC check result is correct.

If the cell CRC information is descrambled by using the cell-specific RNTI and the CRC check result is correct, determine that common triggering exists; if the cell CRC information is descrambled by using the UE-specific RNTI and the CRC check result is correct, determine that dedicated triggering exists; and if the cell CRC information is descrambled by using an RNTI specific for a group of UEs and the CRC check result is correct, determine that group triggering exists; and execute step S308a.

S307b. Determine that no triggering exists if the CRC check result is incorrect, and execute step S308b.

S308a. Transmit first information in the first information subframe or the first information opportunity associated with the PTCH if it is determined that the triggering exists.

S308b. The UE enters a micro-sleep state until the PTCH is detected on a time-frequency resource occupied by a next PTCH if it is determined that no triggering exists.

The trigger method (S301-S308a/S308b) provided by the embodiment is analyzed in detail by taking a specific scenario as an example below, where the UE and the base station interact in the specific scenario, and the PTCH is detected on the determined time-frequency resource occupied by the one PTCH indicated by the time-frequency resource configuration information of the PTCH.

It can be understood that 1-bit information, added with the 16-bit CRC information, may be considered as 17-bit information, and the base station sends the 17-bit information on the time-frequency resource occupied by the one PTCH indicted by the time-frequency resource configuration information of the PTCH. The system or base station preconfigures the time-frequency resource configuration information of the PTCH for the UE. The base station and the UE may agree upon the time-frequency resource configuration information of the PTCH in advance, or the base station informs the UE of the time-frequency resource configuration information of the PTCH by using one or more types of signaling of RRC common signaling (for example, by using SIB or MIB), RRC dedicated signaling, MAC control element CE signaling, and physical layer signaling. For specific information included in the time-frequency resource configuration information of the PTCH, reference may be made to the description of Embodiment 1.

For example: the RRC common signaling RadioResourceConfigCommon may include the following IEs:

```
RadioResourceConfigCommon ::= SEQUENCE {
PTCH-ConfigCommon      PTCH-configCommon,
}
PTCH-ConfigCommon ::= SEQUENCE {
PTCH-StartFrame        INTEGER{0,1,...1023},
PTCH-StartSubframe     INTEGER{0,1,...9},
PTCH-StartSlot         INTEGER{0,1,...20},
PTCH-StartSymbol       INTEGER{0,1,...14},
Period                 ENUMERATED { t1, t2, ....},
SubframeLength         ENUMERATED { x1, x2, ....},
FirstPRBNumber         ENUMERATED { y1, y2, ....},
PRBNumber              ENUMERATED { z1, z2, ....},
PTCH-Power             ENUMERATED { p1, p2, ....},
}.
```

For another example, the RRC dedicated signaling RadioResourceConfigDedicated may include the following IEs:

```
RadioResourceConfigDedicated ::= SEQUENCE {
PTCH-ConfigDedicate    PTCH-configDedicated,
}
PTCH-ConfigDedicated ::= SEQUENCE {
PTCH-StartFrame        INTEGER{0,1,...1023},
PTCH-StartSubframe     INTEGER{0,1,...9},
PTCH-StartSlot         INTEGER{0,1,...20},
PTCH-StartSymbol       INTEGER{0,1,...14},
Period                 ENUMERATED { t1, t2, ....},
SubframeLength         ENUMERATED { x1, x2, ....},
FirstPRBNumber         ENUMERATED { y1, y2, ....},
PRBNumber              ENUMERATED { z1, z2, ....},
PTCH-Power             ENUMERATED { p1, p2, ....},
}.
```

It should be noted that one or more types of the information included in the time-frequency resource configuration information of the PTCH may further be obtained according to configuration information of control channels such as the PDCCH, ePDCCH, PDCCH with coverage enhancement, or ePDCCH with coverage enhancement, which is not specifically limited herein.

If a time-frequency resource occupied by the one PTCH indicated by the time-frequency resource configuration information of the PTCH includes SubframeLength subframes, the base station encodes 17-bit information according to a size of the time-frequency resource occupied by the PTCH in one subframe and repeatedly sends an encoded result in the SubframeLength subframes; or, the base station encodes the 17-bit information according to a size of the time-frequency resource occupied by the PTCH in the SubframeLength subframes and send an encoded result in the SubframeLength subframes.

On the time-frequency resource occupied by the one PTCH indicated by the time-frequency resource configuration information of the PTCH, the UE firstly extracts PTCH information of the received data transmitted by the PTCH in each subframe in the SubframeLength subframes, combines and then decodes the PTCH information in the SubframeLength subframes, or decodes and then combines the PTCH information in the SubframeLength subframes. After the decoding or decoding and then combination, CRC information is descrambled by using an RNTI specific for a cell, a UE, or a group of UEs, and then checking is performed by using the CRC. If the CRC check is successful, uplink triggering and downlink triggering may be distinguished by the UE according to a value of the detected 1-bit indication inflammation; and if the CRC check fails, the UE determines that its own triggering does not exist, and enters a microsleep state until the PTCH is detected on a time-frequency resource occupied by a next PTCH.

It can be known from the above that according to the trigger method provided by the embodiment of the present invention, by detecting the PTCH on the time-frequency resource occupied by the one PTCH indicated by the time-frequency resource configuration information of the PTCH, the first information is transmitted if it is determined that the triggering used to indicate that the first information is transmitted in the first information subframe or the first information opportunity associated with the PTCH exists, so that the user equipment (such as an MTC UE) is prevented from performing unnecessary detection on the PDCCH or ePDCCH when no DCI of the user equipment exists, thereby achieving the purpose of saving user equipment power. Further, the solution may be applied to a case in which the base station does not send the PCFICH and the PDCCH (or ePDCCH) to the user equipment so as to prevent the user equipment (such as the MTC UE) from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs the uplink triggering (authorization) on the user equipment; therefore, the problem caused by reservation of the time-frequency resource on the PUSCH is avoided.

Embodiment 4

Figure 4:
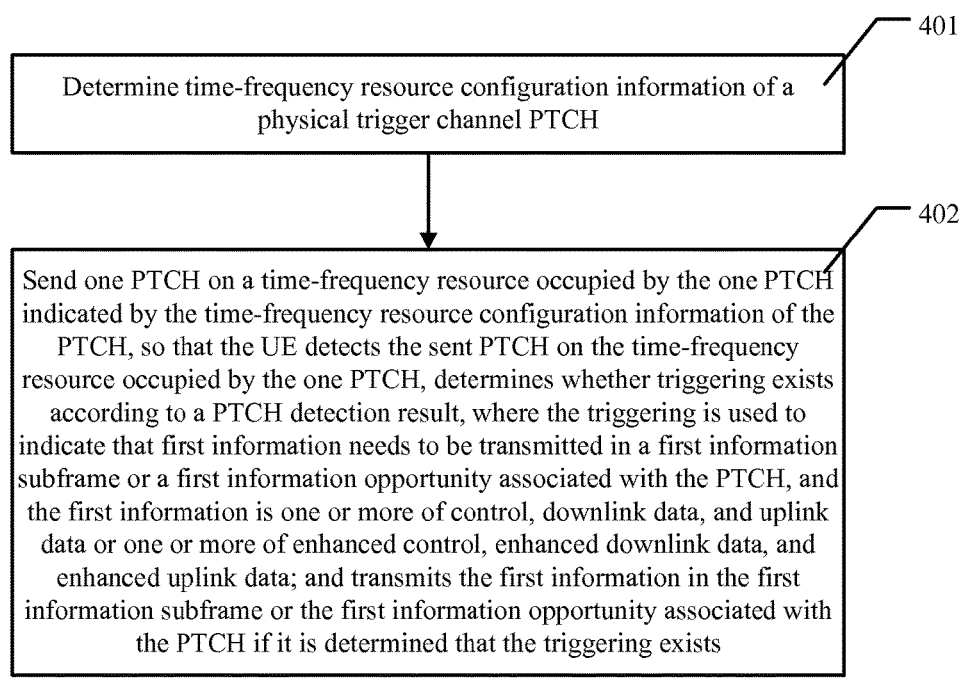
FIG. 4 is a flowchart of another trigger method according to an embodiment of the present invention.

Referring to FIG. 4, FIG. 4 is a flowchart of another trigger method provided by the embodiment of the present invention, where the method includes:

S401. Determine time-frequency resource configuration information of a physical trigger channel PTCH.

It can be understood that the method may be executed by a base station or another sending and receiving trigger apparatus, which is not specifically limited herein.

The time-frequency resource configuration information of the PTCH includes one or more of the following: a start frame number of the PTCH, at least one subframe number, at least one time slot serial number, at least one symbol serial number, a period, the number of subframes occupied by the PTCH, a serial number of a first physical resource block PRB occupied by the PTCH, the number of PRBs occupied by the PTCH, a serial number of a first subcarrier occupied by the PTCH, the number of subcarriers occupied by the PTCH, and power configuration adopted by PTCH transmission, where the period is a time interval between two PTCHs.

S402. Send one PTCH on a time-frequency resource occupied by the one PTCH indicated by the time-frequency resource configuration information of the PTCH.

It can be understood that after the PTCH is sent, the UE is enabled to detect the sent PTCH on the time-frequency resource occupied by the one PTCH, and determine whether triggering exists according to a PTCH detection result, where the triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data; the UE is used to transmit the first information in the first information subframe or the first information opportunity associated with the PTCH if it is determined that the triggering exists; and further, the UE enters a micro-sleep state if it is determined that no triggering exists until the PTCH is detected on a time-frequency resource occupied by a next PTCH.

It should be noted that in the embodiment of the present invention, the triggering may include downlink triggering and uplink triggering, where the downlink triggering may include downlink common triggering, downlink group triggering, and downlink dedicated triggering, and the uplink triggering may include uplink group triggering and uplink dedicated triggering. Definitions of different types of triggering may be the same as those described in Embodiment 1, which are specifically described herein.

It can be known from the above that according to the trigger method provided by the embodiment of the present invention, by sending the PTCH on the time-frequency resource occupied by the one PTCH indicated by the time-frequency resource configuration information of the PTCH, the user equipment receives and detects the PTCH, and transmits first information if it is determined that the triggering used to indicate that the first information needs to be transmitted in the first information subframe or the first information opportunity associated with the PTCH exists, so that the user equipment (such as an MTC UE) is prevented from performing unnecessary detection on the PDCCH or ePDCCH when no DCI of the user equipment exists, thereby achieving the purpose of saving user equipment power. Further, the solution in the embodiment of the present invention may be applied to a case in which the base station does not send the PCFICH and the PDCCH (or ePDCCH) to the user equipment so as to prevent the user equipment (such as the MTC UE) from performing unnecessary detection on the PDSCH when downlink data of the user equipment exists, thereby achieving the purpose of saving user equipment power. In addition, an authorization problem of the PUSCH is resolved, so that the user equipment may send uplink data after the base station performs the uplink triggering (authorization) on the user equipment; therefore, the problem caused by reservation of the time-frequency resource on the PUSCH is avoided.

Embodiment 5

Figure 5:
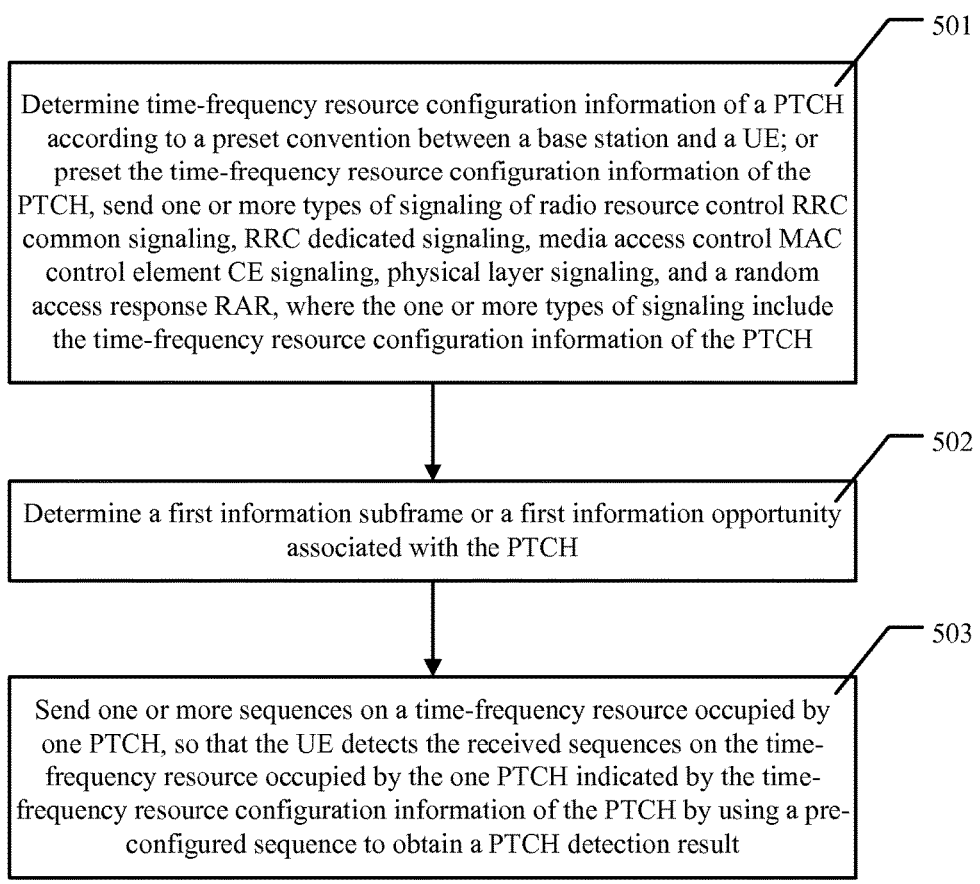
FIG. 5 is another flowchart of another trigger method according to an embodiment of the present invention.

Referring to FIG. 5, FIG. 5 is another flowchart of another trigger method provided by the embodiment of the present invention. The trigger method provided by the embodiment of the present invention is described by using a base station as an execution body in the following embodiment, where the method includes:

S501. Determine time-frequency resource configuration information of a PTCH according to a preset convention between a base station and a UE; or preset the time-frequency resource configuration information of the PTCH.

After the base station presets the time-frequency resource configuration information of the PTCH, the method further includes sending one or more types of signaling of radio resource control RRC common signaling, RRC dedicated signaling, media access control MAC control element CE signaling, physical layer signaling, and a random access response RAR, where the one or more types of signaling include the time-frequency resource configuration information of the PTCH.

S502. Determine a first information subframe or a first information opportunity associated with the PTCH.

In some implementation manners, the first information subframe or the first information opportunity associated with the PTCH is determined according to the time-frequency resource configuration information of the PTCH and a preset time offset; or the first information subframe or the first information opportunity associated with the PTCH is determined according to the time-frequency resource configuration information of the PTCH and resource configuration information of first information.

The resource configuration information of the first information includes one or more of the following: a start frame number of first information transmission, at least one subframe number, at least one time slot serial number, at least one symbol serial number, a period, the number of subframes occupied by one first information transmission, a serial number of a first PRB occupied by the first information transmission, the number of PRBs occupied by the first information transmission, a serial number of a first subcarrier occupied by the first information transmission, the number of subcarriers occupied by the first information transmission, and power configuration adopted by the first information transmission, where the period is a time interval between two first information transmissions.

It can be understood that before the determining a first information subframe or a first information opportunity associated with the PTCH (S502), the method may further include: presetting the resource configuration information of the first information, and sending one or more types of signaling of RRC common signaling, RRC dedicated signaling, MAC control element CE signaling, physical layer signaling, and an RAR, where the one or more types of signaling include the resource configuration information of the first information.

S503. Send one or more sequences on the time-frequency resource occupied by the one PTCH, so that the UE detects the received sequences on the time-frequency resource occupied by the one PTCH indicated by the time-frequency resource configuration information of the PTCH by using a pre-configured sequence to obtain the PTCH detection result.

The pre-configured sequence is determined based on sequence configuration information, the sequence configuration information includes one or more of the following information: index indication information of the sequence, length indication information of the sequence, index indication information of a root sequence for generating the sequence, and length indication information of the root sequence.

It can be understood that before the determining the pre-configured sequence according to the sequence configuration information, the method may further include a step of determining the sequence configuration information, where in some implementation manners, the sequence configuration information may be determined in the following manner:

determining the sequence configuration information according to the preset convention between the base station and the UE; or, presetting the sequence configuration information and sending one or more types of signaling of RRC public signaling, RRC dedicated signaling, MAC control element CE signaling, physical layer signaling, and a random access response RAR, where the one or more types of signaling include the sequence configuration information; or, determining the sequence configuration information according to a random access preamble sent by the UE.

It should be noted that the time-frequency resource configuration information of the PTCH and/or the sequence configuration information, of which the UE is informed by the base station by using one or more types of signaling of RRC dedicated signaling, MAC control element CE signaling, and physical layer signaling, may be further used for one or more of the following: downlink common triggering, downlink group triggering, and uplink group triggering. Therefore, when the PTCH is used for one or more of the following: downlink common triggering, downlink group triggering, and uplink group triggering, the base station does not need to configure the time-frequency resource configuration information of the PTCH and/or the sequence configuration information.

The base station may configure the time-frequency resource configuration information of one PTCH and one pre-configured sequence for a same UE, and the UE may determine whether triggering exists through correlation detection of the sequence. The time-frequency resource configuration information of the one PTCH and the pre-configured sequence may be shared by a plurality of UEs, and used to trigger different UEs. The base station may configure time-frequency resource configuration information of a plurality of different PTCHs for the same UE, and the UE detects different types of triggering by performing correlation detection on the time-frequency resource occupied by the PTCH indicated by the time-frequency resource configuration information of the different PTCHs. The base station may configure a plurality of pre-configured sequences for the same UE, and the UE detects different types of triggering by using the different pre-configured sequences. In addition, the base station may further send a same sequence on the time-frequency resource occupied by the PTCH indicated by the time-frequency resource configuration information of the different PTCHs for triggering different UEs, and may further send different sequences on the time-frequency resource occupied by the PTCH indicated by the time-frequency resource configuration information of the same PTCH for triggering the different UEs.

It can be understood that after obtaining the PTCH detection result, the UE may determine whether triggering exists according to the PTCH detection result; determine that the triggering exists if the PTCH detection result is greater than or equal to a preset threshold, and determine that no triggering exists if the PTCH detection result is less than the preset threshold; transmit first information in the first information subframe or the first information opportunity associated with the PTCH if it is determined that the triggering exists; and further, enter a micro-sleep state until the PTCH is detected on a time-frequency resource occupied by a next PTCH if it is determined that no triggering exists.

A person skilled in the art may clearly understand that for the purpose of convenient and brief description, for specific working processes and specific application scenarios of all steps of the base station side trigger method described in the embodiment, reference may be made to corresponding processes in Embodiment 2 of the foregoing UE side method, which are not described herein again.

It can be known from the above that according to the trigger method provided by the embodiment of the present invention, by sending the PTCH on the time-frequency resource occupied by the one PTCH indicated by the time-frequency resource configuration information of the PTCH, the user equipment performs receiving detection on the PTCH, transmits the first information if it is determined that the triggering used to indicate that the first information needs to be transmitted in the first information subframe or the first information opportunity associated with the PTCH exists, so that the user equipment (such as an MTC UE) is prevented from performing unnecessary detection on the PDCCH or ePDCCH when no DCI of the user equipment exists, thereby achieving the power of saving user equipment power. Further, the solution of the embodiment of the present invention may be applied to a case in which the base station does not send the PCFICH and PDCCH (or ePDCCH) to the user equipment so as to prevent the user equipment (such as the MTC UE) from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs uplink triggering (authorization) on the user equipment; therefore, the problem caused by resource reservation on the PUSCH is avoided.

Embodiment 6

Figure 6:
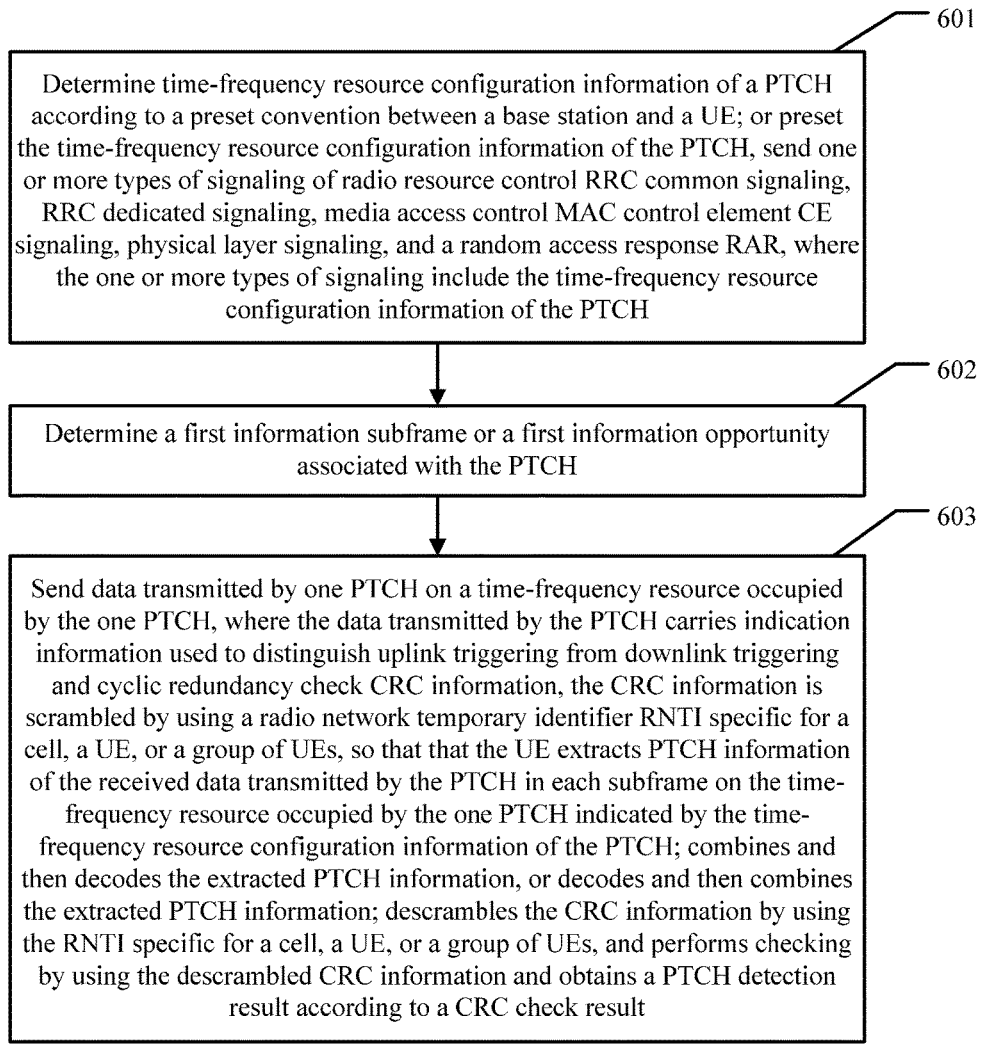
FIG. 6 is another flowchart of another trigger method according to an embodiment of the present invention.

Referring to FIG. 6, FIG. 6 is another flowchart of another trigger method provided by the embodiment of the present invention. The method (taking a base station as an execution body for example) includes:

S601. Determine time-frequency resource configuration information of a PTCH according to a preset convention between a base station and a UE; or preset the time-frequency resource configuration information of the PTCH.

After the presetting the time-frequency resource configuration information of the PTCH by the base station, the method further includes: send one or more types of signaling of radio resource control RRC common signaling, RRC dedicated signaling, media access control MAC control element CE signaling, physical layer signaling, and a random access response RAR, where the one or more types of signaling includes the time-frequency resource configuration information of the PTCH.

S602. Determine a first information subframe or a first information opportunity associated with the PTCH.

It can be understood that for steps S601 and S602, reference may be made to the description of relevant content in the foregoing S501 and S502, which are not specifically described herein.

S603. Send data transmitted by one PTCH on a time-frequency resource occupied by the one PTCH.

The data transmitted by the PTCH carries indication information used to distinguish uplink triggering from downlink triggering and cyclic redundancy check CRC information; the CRC information is scrambled by using a radio network temporary identifier RNTI specific for a cell, a UE, or a group of UEs, so that the UE extracts PTCH information of the received data transmitted by the PTCH in each subframe on the time-frequency resource occupied by the one PTCH indicated by the time-frequency resource configuration information of the PTCH; and combines and decodes the extracted PTCH information, or decodes and then combines the extracted PTCH information; and descrambles CRC information by using the RNTI specific for a cell, a UE, or a group of UEs and performs checking by using the descrambled CRC information, and obtains a PTCH detection result according to a CRC check result.

The cell-specific RNTI is one of a system information ratio network temporary identifier SI-RNTI and a paging radio network temporary identifier P-RNTI, the UE-specific RNTI is one of a cell radio network temporary identifier C-RNTI, a semi-persistent scheduling radio network temporary identifier SPS-RNTI, and a transmission power control physical uplink control channel radio network temporary identifier TPC-PUSCH-RNTI, and the RNTI specific for a group of UEs is one of a random access radio network temporary identifier RA-RNTI and a temporary cell radio network temporary identifier Temporary C-RNTI.

It can be understood that information borne by the data transmitted by the PTCH can be considered as 16-bit CRC information (the bit number of the CRC information may be another value, the CRC information is described by using the bit number of 16 as an example in the embodiment) is added behind 1-bit indication information, and in this embodiment, when the 1-bit indication information is 0, it may indicate that the PTCH is used for uplink triggering; when the 1-bit indication information is 1, it may indicate that the PTCH is used for downlink triggering, where the downlink triggering may include downlink common triggering, downlink group triggering, and downlink dedicated triggering; and the uplink triggering may include uplink group triggering and uplink dedicated triggering. Definitions of different types of triggering may be the same as those described in Embodiment 1, which are not specifically described herein.

When the 1-bit indication information is 0 and the PTCH is used for the uplink dedicated triggering, the 16-bit CRC information is scrambled by using one of the C-RNTI, the SPS C-RNTI, the TPC-PUCCH-RNTI, and the TPC-PUSCH-RNTI; when the 1-bit indication information is 0 and the PTCH is used for uplink group triggering, the 16-bit CRC information is scrambled by using the Temporary C-RNTI; when the 1-bit indication information is 1 and the PTCH is used for the downlink common triggering, the 16-bit CRC information is scrambled by using the SI-RNTI or P-RNTI; when the 1-bit indication information is 1 and the PTCH is used for the downlink group triggering, the 16-bit CRC information is scrambled by using the Temporary C-RNTI or RA-RNTI; and when the 1-bit indication information is 1 and the PTCH is used for the downlink dedicated triggering, the 16-bit CRC information is scrambled by using the C-RNTI or SPS C-RNTI. Optionally, a radio network temporary identifier specific for a group of UEs may also be used to scramble the 16-bit CRC information and trigger one group of different UEs. For example, the 16-bit CRC information is scrambled by using a group radio network temporary identifier G-RNTI, where a value of the G-RNTI may be obtained according to a preset rule based on a subscription message (IMSI) and/or equipment information (IMEI), such as G-RNTI=(IMSI)mod(X), where X is a fixed value and mod ( ) is a modulo operation.

If the time-frequency resource occupied by the one PTCH indicated by the time-frequency resource configuration information of the PTCH includes SubframeLength subframes, the base station encodes 17-bit information according to a size of the time-frequency resource occupied by the PTCH in one subframe and repeatedly sends an encoded result in the SubframeLength subframes; or, the base station encodes the 17-bit information according to a size of the time-frequency resource occupied by the PTCH in the SubframeLength subframes and sending the encoded result in the SubframeLength subframes.

It can be understood that after obtaining the PTCH detection result, the UE may determine whether triggering exists according to the PTCH detection result; determine that common triggering exists if the cell CRC information is descrambled by using a cell-specific RNTI and the CRC check result is correct; determine that dedicated triggering exists if the cell CRC information is descrambled by using a UE-specific RNTIs and the CRC check result is correct; determine that group triggering exists if the cell CRC information is descrambled by using an RNTI specific for a group of UEs and the CRC check result is correct, determine that no triggering exists if the CRC check result is incorrect; transmit first information in the first information subframe or the first information opportunity associated with the PTCH if it is determined that the triggering exists; and further, enter a micro-sleep state until the PTCH is detected on a time-frequency resource occupied by a next PTCH if it is determined that no triggering exists.

A person skilled in the art may clearly understand that for the purpose of convenient and brief description, for specific working processes and specific application scenarios of all steps of the base station side trigger method described in the embodiment, reference may be made to corresponding processes in Embodiment 3 of the foregoing UE side method, which are not described herein again.

It can be known from the above that according to the trigger method provided by the embodiment of the present invention, by sending the PTCH on the time-frequency resource occupied by the one PTCH indicated by the time-frequency resource configuration information of the PTCH, the user equipment performs receiving detection on the PTCH, and transmits first information if it is determined that the triggering used to indicate that the first information needs to be transmitted in the first information subframe or the first information opportunity associated with the PTCH exists, so that the user equipment (such as an MTC UE) is prevented from performing unnecessary detection on the PDCCH or ePDCCH when no DCI of the user equipment exists, thereby achieving the purpose of saving user equipment power. Further, the solution can be applied to a case in which the base station does not send the PCFICH and the PDCCH (or ePDCCH) to the user equipment, so that the user equipment (such as the MTC UE) is prevented from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs the uplink triggering (authorization) on the user equipment; therefore, the problem caused by resource reservation on the PUSCH is avoided.

To better implement the technical solution in the embodiment of the present invention, an embodiment of the present invention further provides a related apparatus used to implement the forgoing trigger method. Meanings of nouns are the same as those in the foregoing trigger methods. For specific implementation detail, reference may be made to the descriptions in the method embodiments.

Embodiment 7

Figure 7:
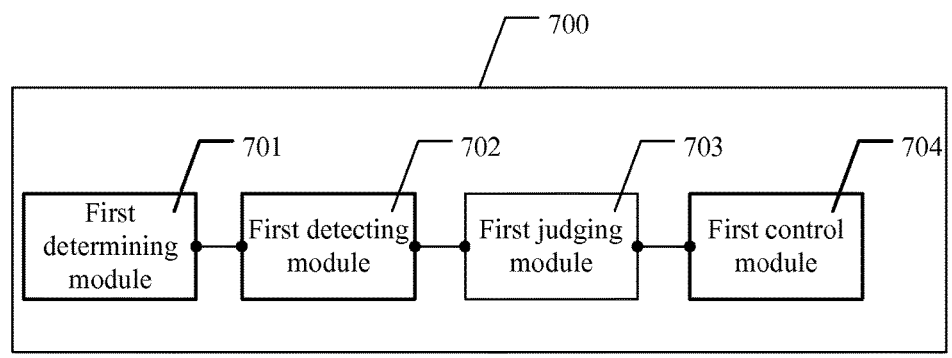
FIG. 7 is a schematic structural diagram of a trigger apparatus according to an embodiment of the present invention.

Referring to FIG. 7, FIG. 7 is a schematic structural diagram of a trigger apparatus 700 provided by the embodiment of the present invention, where the trigger apparatus 700 includes:

a first determining module 701, configured to determine time-frequency resource configuration information of a physical trigger channel PTCH;

it can be understood that the trigger apparatus 700 in the embodiment may be a user equipment UE (such as an MTC UE) or another sending and receiving trigger apparatus, which is not specifically limited herein;

the time-frequency resource configuration information of the PTCH includes one or more of the following: a start frame number of the PTCH, at least one subframe number, at least one time slot serial number, at least one symbol serial number, a period, the number of subframes occupied by the PTCH, a serial number of a first physical resource block PRB occupied by the PTCH, the number of PRBs occupied by the PTCH, a serial number of a first subcarrier occupied by the PTCH, the number of subcarriers occupied by the PTCH, and power configuration adopted by PTCH transmission, where the period is a time interval between two PTCHs;

a first detecting module 702, configured to detect one PTCH on a time-frequency resource occupied by the one PTCH indicated by the time-frequency resource configuration information of the PTCH;

a first judging module 703, configured to determine whether triggering exists according to a PTCH detection result;

the triggering is configured to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced downlink data; and a first control module 704, configured to transmit the first information in the first information subframe or the first information opportunity associated with the PTCH if it is determined that the triggering exists.

It should be noted that in the embodiment of the present invention, the triggering may include downlink triggering and uplink triggering, where the downlink triggering may include downlink common triggering, downlink group triggering, and downlink dedicated triggering; and the uplink triggering may include uplink group triggering and uplink dedicated triggering. Definitions of different types of triggering may be the same as those described in Embodiment 1, which are not specifically described herein.

Preferably, on a basis that the time-frequency resource configuration information of the PTCH may be determined in a plurality of manners, the first determining module 701 is specifically configured to: determine the time-frequency resource configuration information of the PTCH according to a preset convention between a base station and a UE; or, determine the time-frequency resource configuration information of the PTCH according to one or more types of signaling of radio resource control RRC common signaling, RRC dedicated signaling, media access control MAC control element CE signaling, physical layer signaling, and a random access response RAR.

Preferably, the trigger apparatus 700 may further include a second determining module, configured to determine the first information subframe or the first information opportunity associated with the PTCH, where the determining the first information subframe or the first information opportunity associated with the PTCH specifically includes: determining the first information subframe or the first information opportunity associated with the PTCH according to the time-frequency resource configuration information of the PTCH and a preset time offset; or, determining the first information subframe or the first information opportunity associated with the PTCH according to the time-frequency resource configuration information of the PTCH and resource configuration information of the first information.

The resource configuration information of the first information includes one or more of the following: a start frame number of the first information transmission, at least one subframe number, at least one time slot serial number, at least one symbol serial number, a period, the number of subframes occupied by one first information transmission, a serial number of a first physical resource block PRB occupied by the first information transmission, the number of PRBs occupied by the first information transmission, a serial number of a first subcarrier occupied by the first information transmission, the number of subcarriers occupied by the first information transmission, and power configuration adopted by the first information transmission, where the period is a time interval between two first information transmissions.

Preferably, on the basis that the resource configuration information of the first information needs to be used when the first information subframe or the first information opportunity associated with the PTCH is determined, the trigger apparatus 700 may further include a third determining module, configured to determine the resource configuration information of the first information according to one or more types of signaling of RRC common signaling, RRC dedicated signaling, MAC control element CE signaling, physical layer signaling, and an RAR.

It can be known from the above that according to the trigger apparatus 700 provided by the embodiment of the present invention, by detecting the PTCH on the time-frequency resource occupied by the one PTCH indicated by the time-frequency resource configuration information of the PTCH, the first information is transmitted if it is determined that the triggering used to indicate that the first information needs to be transmitted in the first information subframe or the first information opportunity associated with the PTCH exists, so that the user equipment (such as an MTC UE) is prevented from performing unnecessary detection on the PDCCH or ePDCCH when no DCI of user equipment exists, thereby achieving the purpose of saving user equipment power. Further, the trigger apparatus 700 provided by the embodiment of the present invention may be further applied to a case in which the base station does not send the PCFICH and the PDCCH (or ePDCCH) to the user equipment, so that the user equipment (such as the MTC UE) is prevented from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs the uplink triggering (authorization) on the user equipment; therefore, the problem caused by reservation of the time-frequency resource on the PUSCH is avoided.

Embodiment 8

Figure 8:
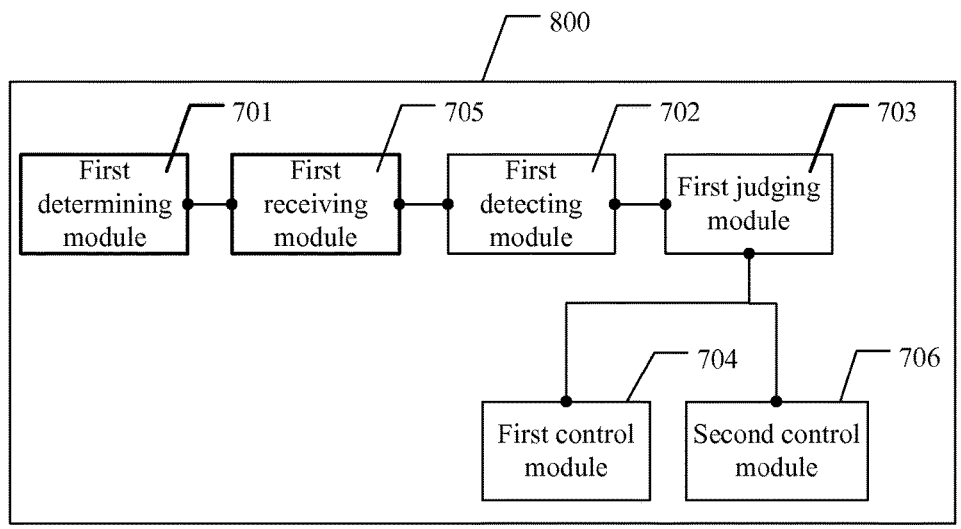
FIG. 8 is another schematic structural diagram of a trigger apparatus according to an embodiment of the present invention.

Referring to FIG. 8, FIG. 8 is another schematic structural diagram of an apparatus 800.

In an implementation manner, in addition to including a first determining module 701, a first detecting module 702, a first judging module 703, and a first control module 704, the trigger apparatus 800 may further include a first receiving module 705, configured to receive one or more sequences on a time-frequency resource occupied by one PTCH before the first detecting module 702 detects the PTCH on the time-frequency resource occupied by the one PTCH indicated by time-frequency resource configuration information of the PTCH.

In this implementation manner, the first detecting module 702 is specifically configured to detect the received sequences on the time-frequency resource occupied by the one PTCH indicated by the time-frequency resource configuration information of the PTCH by using a pre-configured sequence to obtain the PTCH detection result.

Therefore, the trigger apparatus 800 may further include a fourth determining module, configured to determine the pre-configured sequence based on sequence configuration information, where the sequence configuration information includes one or more of the following information: index indication information of the sequence, length indication information of the sequence, index indication information of a root sequence for generating the sequence, and length indication information of the root sequence.

In this implementation manner, the trigger apparatus 800 may further include a fifth determining module, configured to determine the sequence configuration information before the fourth determining module is determines the pre-configured sequence according to the sequence configuration information, where the fifth determining module is specifically configured to determine the sequence configuration information according to a preset convention between a base station and a UE; or, determine the sequence configuration information according to one or more types of signaling of RRC common signaling, RRC dedicated signaling, MAC control element CE signaling, physical layer signaling, and an RAR; or, determine the sequence configuration information according to a random access preamble sent by the UE.

In this implementation manner, the first judging module 703 is specifically configured to determine that triggering exists if the PTCH detection result is greater than or equal to a preset threshold; and otherwise, determine that no triggering exists.

Preferably, the trigger apparatus 800 may further include a second control module 706, configured to enter a micro-sleep state if it is determined that no triggering exists until the PTCH is detected on a time-frequency resource occupied by a next PTCH.

It can be known from the above that according to the trigger apparatus 800 provided by the embodiment of the present invention, by detecting the PTCH on the time-frequency resource occupied by the one PTCH indicated by the time-frequency resource configuration information of the PTCH, the first information is transmitted if it is determined that the triggering used to indicate that the first information needs to be transmitted in the first information subframe or the first information opportunity associated with the PTCH exists, so that the user equipment (such as an MTC UE) is prevented from performing unnecessary detection on the PDCCH or ePDCCH when no DCI of user equipment exists, thereby achieving the purpose of saving user equipment power. Further, the trigger apparatus 800 provided by the embodiments of the present invention may be applied to a case in which the base station does not send the PCFICH and the PDCCH (or ePDCCH), so that the user equipment (such as an MTC UE) is prevented from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs the uplink triggering (authorization) on the user equipment; therefore, the problem caused by resource reservation on the PUSCH is avoided.

Embodiment 9

Figure 9:
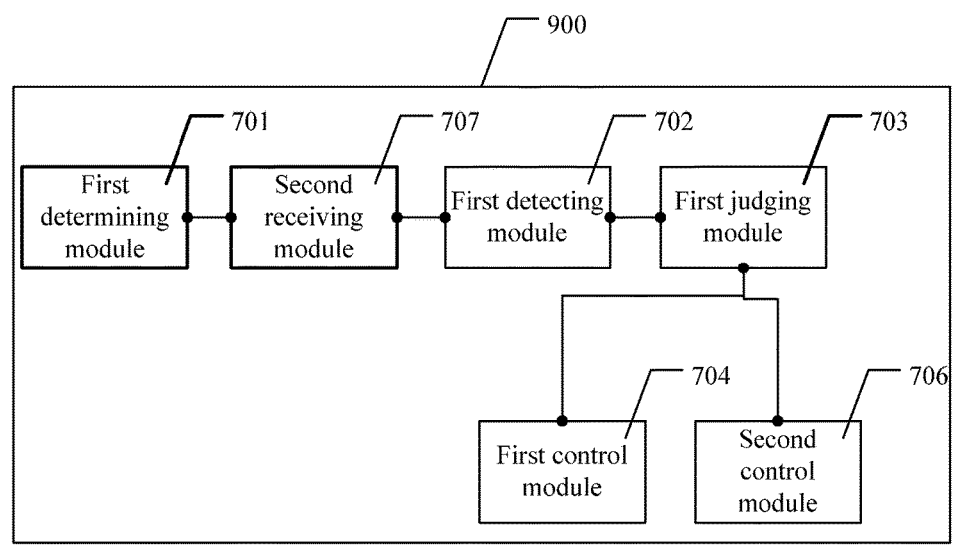
FIG. 9 is another schematic structural diagram of a trigger apparatus according to an embodiment of the present invention.

Referring to FIG. 9, FIG. 9 is another schematic structural diagram of a trigger apparatus 900.

In another implementation manner, in addition to including a first determining module 701, a first detecting module 702, a first judging module 703, a first control module 704, and a second control module 706, the trigger apparatus 900 further includes a second receiving module 707, configured to receive data transmitted by one PTCH on a time-frequency resource occupied by the one PTCH before the first detecting module 702 detects the PTCH on the time-frequency resource occupied by the one PTCH indicated by time-frequency resource configuration information of the PTCH, where the data transmitted by the PTCH carries indication information used to distinguish uplink triggering from downlink triggering and cyclic redundancy check CRC information, and the CRC information is scrambled by using a radio network temporary identifier RNTI specific for a cell, a UE, or a group of UEs.

In this implementation manner, the first detecting module 702 is specifically configured to extract PTCH information of the received data transmitted by the PTCH in each subframe on the time-frequency resource occupied by the one PTCH indicated by the time-frequency resource configuration information of the PTCH; combine and then decode the extracted PTCH information or decode and then combine the extracted PTCH information; and descramble the CRC information by using the RNTI specific for a cell, a UE, or a group of UEs and perform checking by using the descrambled CRC information to obtain the PTCH detection result according to a CRC check result.

In this implementation manner, the first judging module 703 is specifically configured to determine that common triggering exists if the cell CRC information is descrambled by using the cell-specific RNTI and the CRC check result is correct; determine that dedicated triggering exists if the cell CRC information is descrambled by using the UE-specific RNTI and the CRC check result is correct; determine that group triggering exists if the cell CRC information is descrambled by using an RNTI specific for a group of UEs and the CRC check result is correct; and otherwise, determine that no triggering exists.

It can be known from the above that according to the trigger apparatus 900 provided by the embodiment of the present invention, by detecting the PTCH on the time-frequency resource occupied by the one PTCH indicated by the time-frequency resource configuration information of the PTCH, the first information is transmitted if it is determined that the triggering used to indicate that the first information needs to be transmitted in the first information subframe or the first information opportunity associated with the PTCH exists, so that the user equipment (such as an MTC UE) is prevented from performing unnecessary detection on the PDCCH or ePDCCH when no DCI of a user equipment exist, thereby achieving the purpose of saving user equipment power. Further, the trigger apparatus 900 provided by the embodiment of the present invention may be applied to a case in which the base station does not send the PCFICH and the PDCCH (or ePDCCH) to the user equipment, so that the user equipment (such as the MTC UE) is prevented from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs uplink triggering (authorization) on the user equipment; therefore, the problem caused by resource reservation on the PUSCH is avoided.

A person skilled in the art can clearly know that for the purpose of convenient and brief description, for specific working processes of the apparatus and the unit modules in the apparatus described above, reference may be made to corresponding processes in the embodiment of the foregoing method, which are not described herein again.

Embodiment 10

Figure 10:
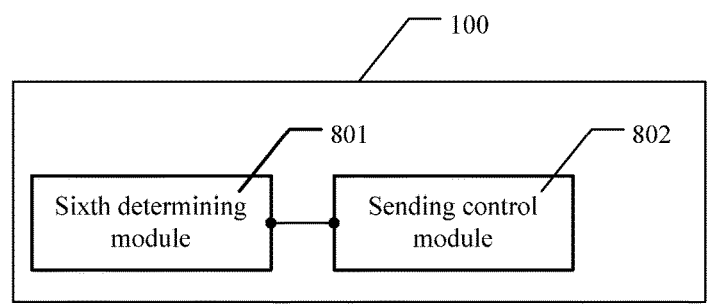
FIG. 10 is a schematic structural diagram of another trigger apparatus according to an embodiment of the present invention.

Referring to FIG. 10, FIG. 10 is a schematic structural diagram of another trigger apparatus 100 provided by the embodiment of the present invention, where the trigger apparatus 100 includes:

a sixth determining module 801, configured to determine time-frequency resource configuration information of a physical trigger channel PTCH;

it can be understood that the trigger apparatus may be a base station or another sending and receiving trigger apparatus, which is not specifically limited herein;

the time-frequency resource configuration information of the PTCH includes one or more of the following: a start frame number of the PTCH, at least one subframe number, at least one time slot serial number, at least one symbol serial number, a period, the number of subframes occupied by the PTCH, a serial number of a first physical resource block PRB occupied by the PTCH, the number of PRBs occupied by the PTCH, serial number of a first subcarrier occupied by the PTCH, the number of subcarriers occupied by the PTCH, and power configuration adopted by PTCH transmission, where the period is a time interval between two PTCHs; and a sending control module 802, configured to send one PTCH on a time-frequency resource occupied by the one PTCH indicated by the time-frequency resource configuration information of the PTCH, so that a UE detects the sent PTCH on the time-frequency resource occupied by the one PTCH and determines whether triggering exists according to a PTCH detection result, where the triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data; the UE transmits the first information in the first information subframe or the first information opportunity associated with the PTCH if it is determined that the triggering exists.

It should be noted that in the embodiment of the present invention, the triggering may include downlink triggering and uplink triggering, where the downlink triggering may include downlink common triggering, downlink group triggering, and downlink dedicated triggering; and the uplink triggering may include uplink group triggering and uplink dedicated triggering. Definitions of different types of triggering may be the same as those described in Embodiment 1, which are not specifically described herein.

Preferably, on the basis that the time-frequency resource configuration information of the PTCH may be determined in a plurality of manners, the sixth determining module 801 is specifically configured to determine the time-frequency resource configuration information of the PTCH according to a preset convention between a base station and the UE; or preset the time-frequency resource configuration information of the PTCH and send one or more types of signaling of radio resource control RRC common signaling, RRC dedicated signaling, media access control MAC control element CE signaling, physical layer signaling, and a random access response RAR, where the one or more types of signaling include the time-frequency resource configuration information of the PTCH.

Preferably, the trigger apparatus 100 further includes a seventh determining module, configured to determine the first information subframe or the first information opportunity associated with the PTCH, where the determining the first information subframe or the first information opportunity associated with the PTCH includes: determining the first information subframe or the first information opportunity according to the time-frequency resource configuration information of the PTCH and a preset time offset; or determining the first information subframe or the first information opportunity according to the time-frequency resource configuration information of the PTCH and resource configuration information of the first information.

The resource configuration information of the first information includes one or more of the following: a start frame number of the first information transmission, at least one subframe number, at least one time slot serial number, at least one symbol serial number, a period, the number of subframes occupied by one first information transmission, a serial number of a first physical resource block PRB occupied by the first information transmission, the number of PRBs occupied by the first information transmission, a serial number of a first subcarrier occupied by the first information transmission, the number of subcarriers occupied by the first information transmission, and power configuration adopted by the first information transmission, where the period is a time interval between two first information transmissions.

Preferably, on the basis that the resource configuration information of the first information needs to be used when the first information subframe or the first information opportunity associated with the PTCH is determined, the trigger apparatus 100 may further include a setting module, configured to preset the resource configuration information of the first information; and the trigger apparatus may further include a first sending module, configured to send one or more types of signaling of RRC common signaling, RRC dedicated signaling, MAC control element CE signaling, physical layer signaling, and an RAR, where the one or more types of signaling include the resource configuration information of the first information.

In an implementation manner, the sending control module 802 may be specifically configured to send one or more sequences on the time-frequency resource occupied by the one PTCH, so that the UE detects the received sequences on the time-frequency resource occupied by the one PTCH indicated by the time-frequency resource configuration information of the PTCH by using a pre-configured sequence to obtain the PTCH detection result.

In this implementation manner, because the pre-configured sequence is determined based on sequence configuration information, the trigger apparatus 100 may further include an eighth determining module, configured to determine the pre-configured sequence based on the sequence configuration information, where the sequence configuration information includes one or more of the following information: index indication information of the sequence, length indication information of the sequence, index indication information of a root sequence for generating the sequence, and length indication information of the root sequence.

In this implementation manner, the trigger apparatus 100 may further include a ninth determining module, configured to determine the sequence configuration information. Specifically, the trigger apparatus 100 may be configured to determine the sequence configuration information according to the preset convention between the base station and the UE; or preset the sequence configuration information and send one or more types of signaling of RRC common signaling, RRC dedicated signaling, MAC control element CE signaling, physical layer signaling, and a random access response RAR, where the one or more types of signaling include the sequence configuration information; or determine the sequence configuration information according to a random access preamble sent by the UE.

In another implementation manner, the sending control module 802 may be specifically configured to send data transmitted by the PTCH on the time-frequency resource occupied by the one PTCH, where the data transmitted by the PTCH carries indication information used to distinguish uplink triggering from downlink triggering and cyclic redundancy check CRC information, the CRC information is scrambled by using a radio network temporary identifier RNTI specific for a cell, a UE, or a group of UEs, so that the UE extracts PTCH information of the received data transmitted by the PTCH in each subframe on the time-frequency resource occupied by the one PTCH indicated by the time-frequency resource configuration information of the PTCH, combines and decodes the extracted PTCH information, or decodes and then combined the extracted PTCH information; and the CRC information is descrambled by using the RNTI specific for a cell, a UE, or a group of UEs, and the checking is performed by using the descrambled CRC information, and the PTCH detection result is obtained according to a CRC check result.

It can be known from the above that according to the trigger apparatus provided by the embodiment of the present invention, by sending the PTCH on the time-frequency resource occupied by the one PTCH indicated by the time-frequency resource configuration information of the PTCH, the user equipment performs receiving detection on the PCTCH, and transmits first information if it is determined that the triggering used to indicate that the first information needs to be transmitted in the first information subframe or the first information opportunity associated with the PTCH exists, so that the user equipment (such as an MTC UE) is prevented from performing unnecessary detection on the PDCCH or ePDCCH when no DCI of the user equipment exists, thereby achieving the purpose of saving user equipment power. Further, the trigger apparatus provided by the embodiment of the present invention may be applied to a case in which the base station does not send the PCFICH and the PDCCH (or ePDCCH) to the user equipment, so that the user equipment (such as the MTC UE) is prevented from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs uplink triggering (authorization) on the user equipment; therefore, the problem caused by resource reservation on the PUSCH is avoided.

A person skilled in the art can clearly understand that for the purpose of convenient and brief description, for specific working processes of the apparatus and the unit modules in the apparatus described above, reference may be made to corresponding processes in the embodiment of the foregoing method, which are not described herein again.

Embodiment 11

Figure 11:
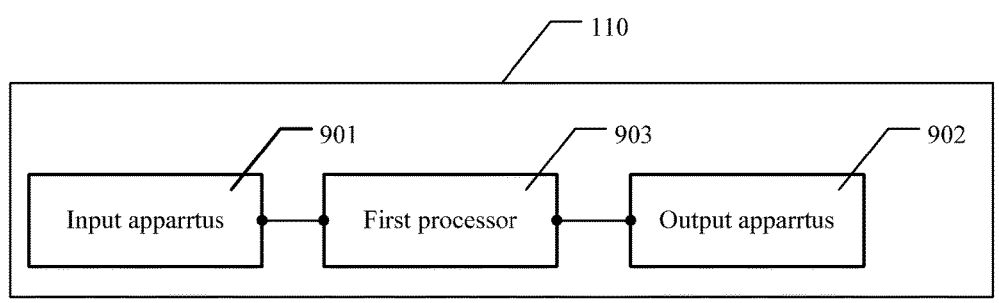
FIG. 11 is a schematic structural diagram of another trigger apparatus according to an embodiment of the present invention.

Referring to FIG. 11, FIG. 11 is a schematic structural diagram of another trigger apparatus 110 provided by the embodiment of the present invention. The trigger apparatus 110 includes an input apparatus 901, an output apparatus 902, and a first processor 903, where the first processor 903 executes the following steps:

determine time-frequency resource configuration information of a physical trigger channel PTCH; detect one PTCH on a time-frequency resource occupied by the one PTCH indicated by the time-frequency resource configuration information of the PTCH; determine whether triggering exists according to a PTCH detection result, where the triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data; and transmit the first information in the first information subframe or the first information opportunity associated with the PTCH if it is determined that the triggering exists.

Preferably, the first processor 903 may further execute the following steps: enter a micro-sleep state if it is determined that no triggering exists until the PTCH is detected on a time-frequency resource occupied by a next PTCH.

The time-frequency resource configuration information of the PTCH includes one or more of the following: a start frame number of the PTCH, at least one subframe number, at least one time slot serial number, at least one symbol serial number, a period, the number of subframes occupied by the PTCH, a serial number of a first physical resource block PRB occupied by the PTCH, the number of PRBs occupied by the PTCH, a serial number of a first subcarrier occupied by the PTCH, the number of subcarriers occupied by the PTCH, and power configuration adopted by PTCH transmission, where the period is a time interval between two PTCHs.

It should be noted that in the embodiment of the present invention, the triggering may include downlink triggering and downlink triggering, where the downlink triggering may include downlink common triggering, downlink group triggering, and downlink dedicated triggering, and the uplink triggering may include uplink group triggering and uplink dedicated triggering. Definitions of different types of triggering may be the same as those described in Embodiment 1, which are not specifically described herein.

Preferably, on the basis that the time-frequency resource configuration information of the PTCH may be determined in a plurality of manners, the first processor 903 further executes the following step: determine the time-frequency resource configuration information of the PTCH according to a preset convention between a base station and a UE; or determine the time-frequency resource configuration information of the PTCH according to one or more types of signaling of radio resource control RRC common signaling, RRC dedicated signaling, media access control MAC control element CE signaling, physical layer signaling, and a random access response RAR.

Preferably, the first processor 903 further executes the following step: determine the first information subframe or the first information opportunity associated with the PTCH according to the time-frequency resource configuration information of the PTCH and a preset time offset; or, determine the first information subframe or the first information opportunity associated with the PTCH according to the time-frequency resource configuration information of the PTCH and resource configuration information of the first information.

The resource configuration information of the first information includes one or more of the following: a start frame number of the first information transmission, at least one subframe number, at least one time slot serial number, at least one symbol serial number, a period, the number of subframes occupied by one first information transmission, a serial number of a first physical resource block PRB occupied by the first information transmission, the number of PRBs occupied by the first information transmission, a serial number of a first subcarrier occupied by the first information transmission, the number of subcarriers occupied by the first information transmission, and power configuration adopted by the first information transmission, where the period is a time interval between two first information transmissions.

Preferably, on the basis that the resource configuration information of the first information needs to be used when the first information subframe or the first information opportunity associated with the PTCH is determined, the first processor 903 further executes the following step: determine the resource configuration information of the first information according to one or more types of signaling of RRC common signaling, RRC dedicated signaling, MAC control element CE signaling, physical layer signaling, and an RAR.

In an implementation manner, the first processor 903 may specifically execute the following steps: determine the time-frequency resource configuration information of the PTCH; receive one or more sequences on the time-frequency resource occupied by the one PTCH; detect the received sequences on the time-frequency resource occupied by the one PTCH indicated by the time-frequency resource configuration information of the PTCH by using a pre-configured sequence to obtain the PTCH detection result; if the PTCH detection result is greater than or equal to a preset threshold, determine that the triggering exists; and otherwise, determine that no triggering exists.

Preferably, in this implementation manner, the first processor 903 may further execute the following step: determine the pre-configured sequence based on sequence configuration information, where the sequence configuration information includes one or more of the following information: index indication information of the sequence, length indication information of the sequence, index indication information of a root sequence for generating the sequence, and length indication information of the root sequence.

In this implementation manner, the first processor 903 may further execute the following step: determine the sequence configuration information, which may specifically include: determine the sequence configuration information according to the preset convention between the base station and the UE; or determine the sequence configuration information according to one or more types of signaling of RRC common signaling, RRC dedicated signaling, MAC control element CE signaling, physical layer signaling, and an RAR; or, determine the sequence configuration information according to a random access preamble sent by the UE.

In another implementation manner, the first processor 903 specifically executes the following step: determine the time-frequency resource configuration information of the PTCH; receive data transmitted by the PTCH on the time-frequency resource occupied by the one PTCH, where the data transmitted by the PTCH carries indication information used to distinguish uplink triggering from downlink triggering and cyclic redundancy check CRC information, and the CRC information is scrambled by using a radio network temporary identifier RNTI specific for a cell, a UE, or a group of UEs; extract PTCH information of the received data transmitted by the PTCH in each subframe on the time-frequency resource occupied by the one PTCH indicated by the time-frequency resource configuration information of the PTCH; combine and then decode the extracted PTCH information, or decode and then combine the extracted PTCH information; descramble the CRC information by using the RNTI specific for a cell, a UE, or a group of UEs and perform checking by using the descrambled CRC information to obtain the PTCH detection result; if the cell CRC information is descrambled by using the cell-specific RNTI and a CRC check result is correct, determine that common triggering exists; if the cell CRC information is descrambled by using the UE-specific RNTI and the CRC check result is correct, determine that dedicated triggering exists; if the cell CRC information is descrambled by using the RNTI specific for a group of UEs and the CRC check result is correct, determine that group triggering exists; and otherwise, determine that no triggering exists.

In this two implementation manners, specific processes of determining the time-frequency resource configuration information of the PTCH, determining the first information subframe or the first information opportunity associated with the PTCH, and determining the resource configuration information of the first information by the first processor 903 may be specifically implemented by referring to the foregoing content of the embodiment It can be known from the above that according to the trigger apparatus provided by the embodiment of the present invention, by detecting the PTCH on the time-frequency resource occupied by the one PTCH indicated by the time-frequency resource configuration information of the PTCH, the first information is transmitted if it is determined that the triggering used to indicate that the first information needs to be transmitted in the first information subframe or the first information opportunity associated with the PTCH exists, so that the user equipment (such as an MTC UE) is prevented from performing unnecessary detection on the PDCCH or ePDCCH when no DCI of a user equipment exists, thereby achieving the purpose of saving user equipment power. Further, the trigger apparatus provided by the embodiment of the present invention may be applied to a case in which the base station does not send the PCFICH and the PDCCH (or ePDCCH) to the user equipment, so that the user equipment (such as an MTC UE) is prevented from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs uplink triggering (authorization) on the user equipment; therefore, the problem caused by resource reservation on the PUSCH is avoided.

A person skilled in the art can clearly understand that for the purpose of convenient and brief description, for specific working processes of the apparatus and the unit modules in the apparatus described above, reference may be made to corresponding processes in the embodiment of the foregoing method, which are not described herein again.

Embodiment 12

Figure 12:
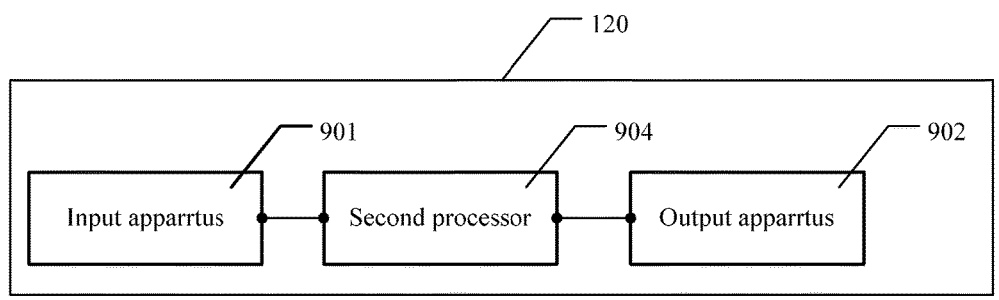
FIG. 12 is a schematic structural diagram of another trigger apparatus according to an embodiment of the present invention.

Referring to FIG. 12, FIG. 12 is a schematic structural diagram of another trigger apparatus 120 provided by the embodiment of the present invention. The trigger apparatus 120 includes an input apparatus 901, an output apparatus 902, and a second processor 904, where the second processor 904 executes the following steps:

determine time-frequency resource configuration information of a physical trigger channel PTCH; and send one PTCH on a time-frequency resource occupied by the one PTCH indicated by the time-frequency resource configuration information of the PTCH, so that a UE detects the sent PTCH on the time-frequency resource occupied by the one PTCH and determines whether triggering exists according to a PTCH detection result, where the triggering is used to indicate that first information needs to be transmitted in a first information subframe or a first information opportunity associated with the PTCH, and the first information is one or more of the following: control, downlink data, and uplink data, or one or more of the following: enhanced control, enhanced downlink data, and enhanced uplink data; and transmits the first information in the first information subframe or the first information opportunity associated with the PTCH if it is determined that the triggering exists.

The time-frequency resource configuration information of the PTCH includes one or more of the following: a start frame number of the PTCH, at least one subframe number, at least one time slot serial number, at least one symbol serial number, a period, the number of subframes occupied by the PTCH, a serial number of a first physical resource block PRB occupied by the PTCH, the number of PRBs occupied by the PTCH, a serial number of a first subcarrier occupied by the PTCH, the number of subcarriers occupied by the PTCH, and power configuration adopted by PTCH transmission, where the period is a time interval between two PTCHs.

It should be noted that in the embodiment of the present invention, the triggering may include downlink triggering and downlink triggering, where the downlink triggering may include downlink common triggering, downlink group triggering, and downlink dedicated triggering, and the uplink triggering may include uplink group triggering and uplink dedicated triggering. Definitions of different types of triggering may be the same as those described in Embodiment 1, which are not specifically described herein.

Preferably, on the basis that the time-frequency resource configuration information of the PTCH may be determined in a plurality of manners, the second processor 904 further executes the following step: determine the time-frequency resource configuration information of the PTCH according to a preset convention between a base station and the UE; or preset the time-frequency resource configuration information of the PTCH and send one or more types of signaling of radio resource control RRC common signaling, RRC dedicated signaling, media access control MAC control element CE signaling, physical layer signaling, and a random access response RAR, where the one or more types of signaling include the time-frequency resource configuration information of the PTCH.

Preferably, the second processor 904 further executes the following step: determine the first information subframe or the first information opportunity associated with the PTCH according to the time-frequency resource configuration information of the PTCH and a preset time offset; or, determine the first information subframe or the first information opportunity associated with the PTCH according to the time-frequency resource configuration information of the PTCH and resource configuration information of the first information.

The resource configuration information of the first information includes one or more of the following: a start frame number of the first information transmission, at least one subframe number, at least one time slot serial number, at least one symbol serial number, a period, the number of subframes occupied by one first information transmission, a serial number of a first physical resource block PRB occupied by the first information transmission, the number of PRBs occupied by the first information transmission, a serial number of a first subcarrier occupied by the first information transmission, the number of subcarriers occupied by the first information transmission, and power configuration adopted by the first information transmission, where the period is a time interval between two first information transmissions.

Preferably, on the basis that the resource configuration information of the first information needs to be used when the first information subframe or the first information opportunity associated with the PTCH is determined, the second processor 904 further executes the following steps: preset the resource configuration information of the first information and send one or more types of signaling of RRC common signaling, RRC dedicated signaling, MAC control element CE signaling, physical layer signaling, and an RAR, where the one or more types of signaling include the resource configuration information of the first information.

In an implementation manner, the second processor 904 may specifically execute the following steps: determine the time-frequency resource configuration information of the PTCH; send one or more sequences on the time-frequency resource occupied by the one PTCH, so that the UE detects the received sequences on the time-frequency resource occupied by the one PTCH indicated by the time-frequency resource configuration information of the PTCH by using a pre-configured sequence and obtains the PTCH detection result.

In this implementation manner, because the pre-configured sequence is determined based on sequence configuration information, the second processor 904 may further execute the following step: determine the pre-configured sequence based on the sequence configuration information, where the sequence configuration information includes one or more index indication information of the sequence, length indication information of the sequence, index indication information of a root sequence for generating the sequence, and length indication information of the root sequence.

In this implementation manner, the second processor 904 may further execute the following step: determine the sequence configuration information. Specifically, the second processor 904 may determine the sequence configuration information according to the preset convention between the base station and the UE; or determine the sequence configuration information according to one or more types of signaling of RRC common signaling, RRC dedicated signaling, MAC control element CE signaling, physical layer signaling, and a random access response RAR; or, determine the sequence configuration information according to a random access preamble sent by the UE.

In another implementation manner, the second processor 904 may specifically execute the following steps: determine the time-frequency resource configuration information of the PTCH; and receive data transmitted by the PTCH on the time-frequency resource occupied by the one PTCH, where the data transmitted by the PTCH carries indication information used to distinguish uplink triggering from downlink triggering and cyclic redundancy check CRC information, the CRC information is scrambled by using a radio network temporary identifier RNTI specific for a cell, a UE, or a group of UEs, so that the UE extracts PTCH information of the received data transmitted by the PTCH in each subframe on the time-frequency resource occupied by the one PTCH indicated by the time-frequency resource configuration information of the PTCH; combines and then decodes the extracted PTCH information, or decodes and then combines the extracted PTCH information; and descrambles the CRC information by using the RNTI specific for a cell, a UE, or a group of UEs and performs checking by using the descrambled CRC information and obtains the PTCH detection result according to a CRC check result.

In these two implementation manners, specific processes of determining the time-frequency resource configuration information of the PTCH, determining the first information subframe or the first information opportunity associated with the PTCH, and determining the resource configuration information of the first information by the second processor 904 may be specifically implemented by referring to the foregoing content of the embodiment It can be known from the above that according to the trigger apparatus provided by the embodiment of the present invention, by sending the PTCH on the time-frequency resource occupied by the one PTCH indicated by the time-frequency resource configuration information of the PTCH, the first information is transmitted if it is determined that the triggering used to indicate that the first information needs to be transmitted in the first information subframe or the first information opportunity associated with the PTCH exists, so that the user equipment (such as an MTC UE) is prevented from performing unnecessary detection on the PDCCH or ePDCCH when no DCI of the user equipment exists, thereby achieving the purpose of saving user equipment power. Further, the trigger apparatus provided by the embodiment of the present invention may be applied to a case in which the base station does not send the PCFICH and the PDCCH (or ePDCCH) to the user equipment, so that the user equipment (such as the MTC UE) is prevented from performing unnecessary detection on the PDSCH when no downlink data of the user equipment exists, thereby achieving the purpose of saving user equipment power. In addition, an authorization problem of the PUSCH is resolved, so that the user equipment may send uplink data after the base station performs uplink triggering (authorization) on the user equipment; therefore, the problem caused by resource reservation on the PUSCH is avoided.

It may be clearly understood by a person skilled in the art that, for the purpose of convenient and brief description, for a detailed working process of the foregoing apparatus and unit module in the apparatus, reference may be made to a corresponding process in the foregoing method embodiments, and detail are not described herein again.

A person of ordinary skill in the art may understand that all or a part of the steps of the foregoing method embodiments may be implemented by a program instructing relevant hardware. The foregoing program may be stored in a computer readable storage medium and includes several instructions for instructing a computer apparatus (which may be a personal computer, a server, or a network apparatus) to perform all or a part of the steps of the methods described in the embodiments of the present invention. The foregoing storage medium includes: any mediums that can store program code, such as a USB flash drive, a removable hard disk, a read-only memory (ROM, Read-Only Memory), a random access memory (RAM, Random Access Memory), a magnetic disk, or an optical disc.

A trigger method and related apparatus provided by the present invention are described in detail above, and a person of ordinary skill in the art may make some changes on a specific implementation manner and an application scope according to the idea of the embodiment of the present invention. In conclusion, the contents in the specification should not be understood as a limitation on the present invention.

What is claimed is:

1. A trigger method, comprising:
   determining, by a user equipment (UE), time-frequency resource configuration information of a physical trigger channel (PTCH), wherein the time-frequency resource configuration information comprises a serial number of a first physical resource block (PRB) occupied by the PTCH, and a number of PRBs occupied by the PTCH;
   receiving, by the UE while the UE is in a power saving state, the PTCH on a time-frequency resource indicated by the time-frequency resource configuration information, wherein while the UE is in the power saving state the UE does not detect information on a Physical Downlink Shared Channel (PDSCH) and does not detect information on a Physical Downlink Control Channel (PDCCH);
   receiving two or more sequences on the time-frequency resource occupied by the PTCH, wherein at least one of the two or more sequences triggers one or more UEs, and wherein the two or more sequences are sequences with a zero-correlation zone;
   determining that triggering exists according to the received PTCH, to indicate that a first information specific to the UE is in a first information subframe or a first information opportunity associated with the PTCH, wherein the first information is selected from the group consisting of control information, downlink data, enhanced control information, and enhanced downlink data; and
   receiving, by the UE, in response to determining that the triggering exists, the first information in the first information subframe or the first information opportunity associated with the PTCH, wherein the first information is received on a channel different from the PTCH.

2. The method according to claim 1, further comprising:
   determining the first information subframe or the first information opportunity associated with the PTCH; and
   wherein determining the first information subframe or the first information opportunity associated with the PTCH comprises performing one or more of:
     determining the first information subframe or the first information opportunity associated with the PTCH according to the time-frequency resource configuration information of the PTCH and a preset time offset; and
     determining the first information subframe or the first information opportunity associated with the PTCH according to the time-frequency resource configuration information of the PTCH and resource configuration information of the first information.

3. The method according to claim 1, wherein determining that the triggering exists according to the received PTCH further comprises:
   detecting whether the triggering exists according to a result of a correlation operation with the two or more sequences on the time-frequency resource occupied by the PTCH and a pre-configured sequence.

4. The method according to claim 3, wherein the pre-configured sequence is determined based on sequence configuration information, and the sequence configuration information comprises one or more of index indication information of the two or more sequences, length indication information of the two or more sequences, index indication information of a root sequence for generating the two or more sequences, and length indication information of the root sequence.

5. The method according to claim 4, further comprising determining the sequence configuration information according to one or more of:
   a preset convention between abase station and the UE; and
   one or more types of signaling of radio resource control (RRC) common signaling, RRC dedicated signaling, media access control (MAC) control element (CE) signaling, physical layer signaling, and a random access response (RAR).

6. The method according to claim 1, further comprising:
   receiving, before receiving the PTCH, data transmitted on the time-frequency resource occupied by the PTCH;
   wherein the data transmitted on the time-frequency resource occupied by the PTCH carries indication information used to distinguish uplink triggering from downlink triggering and cyclic redundancy check (CRC) information; and
   wherein the CRC information is scrambled based on a radio network temporary identifier (RNTI) specific for a cell, a UE, or a group of UEs.

7. A trigger method, comprising:
   determining, by a base station, time-frequency resource configuration information of a physical trigger channel (PTCH);
   transmitting, by the base station to a user equipment (UE) that is in a power saving state, the PTCH on a time-frequency resource indicated by the time-frequency resource configuration information, wherein the PTCH comprises two or more sequences and at least one of the two or more sequences triggers one or more UEs, wherein the two or more sequences are sequences with a zero-correlation zone, wherein the PTCH indicates that a first information specific to the UE is in a first information subframe or a first information opportunity associated with the PTCH, wherein the first information is selected from the group consisting of control information, downlink data, enhanced control information, and enhanced downlink data, wherein while the UE is in the power saving state the base station does not successfully transmit information to the UE on a physical downlink control channel (PDCCH), an enhanced PDCCH, a random access channel (RACH), a physical downlink shared channel (PDSCH), and a physical control format indicator channel (PCFICH); and
   transmitting, by the base station, the first information to the UE in the first information subframe or the first information opportunity, wherein the first information is transmitted on a channel different from the PTCH.

8. The method according to claim 7, further comprising:
   determining the first information subframe or the first information opportunity associated with the PTCH; and
   wherein the determining the first information subframe or the first information opportunity associated with the PTCH comprises performing one or more of:
      determining the first information subframe or the first information opportunity associated with the PTCH according to the time-frequency resource configuration information of the PTCH and a preset time offset; and
      determining the first information subframe or the first information opportunity associated with the PTCH according to the time-frequency resource configuration information of the PTCH and resource configuration information of the first information.

9. The method according to claim 7, wherein transmitting the first information comprises:
   transmitting two or more sequences on a PDCCH or an enhanced PDCCH.

10. The method according to claim 7, further comprising:
    prior to transmitting the PTCH, transmitting data on the time-frequency resource of the PTCH, wherein the data transmitted carries indication information used to distinguish uplink triggering from downlink triggering and cyclic redundancy check (CRC) information, wherein the CRC information is scrambled by using a radio network temporary identifier (RNTI) specific for a cell, a UE, or a group of UEs, enabling the UE to extract the PTCH from the data transmitted in each subframe on the time-frequency resource occupied by the PTCH.

11. A user equipment (UE), comprising:
    a processor; and
    a non-transitory computer readable medium connected to the processor and having stored thereon instructions that, when executed, cause the processor to:
       determine time-frequency resource configuration information of a physical trigger channel (PTCH);
       receive, while the UE is in a power saving state, the PTCH on a time-frequency resource indicated by the time-frequency resource configuration information;
       receive, while the UE is in the power saving state, two or more sequences on the time-frequency resource occupied by the PTCH, wherein at least one of the two or more sequences triggers one or more UEs, wherein the two or more sequences are sequences with a zero-correlation zone, wherein while the UE is in the power saving state the UE does not detect information on a Physical Downlink Shared Channel (PDSCH) and does not detect information on a Physical Downlink Control Channel (PDCCH);
       determine that triggering exists according to the received PTCH and the received two or more sequences, to indicate that a first information specific to the UE is in a first information subframe or a first information opportunity associated with the PTCH, wherein the first information is selected from the group consisting of control information, downlink data, enhanced control information, and enhanced downlink data; and
       receive, in response to determining that the triggering exists, the first information in the first information subframe or the first information opportunity associated with the PTCH, wherein the first information is received on a channel different from the PTCH.

12. The UE according to claim 11, wherein the non-transitory computer readable medium further has stored thereon instructions that, when executed, cause the processor to:
determine the first information subframe or the first information opportunity associated with the PTCH, wherein the determining the first information subframe or the first information opportunity associated with the PTCH comprises performing at least one of determining the first information subframe or the first information opportunity associated with the PTCH according to the time-frequency resource configuration information of the PTCH and a preset time offset or determining the first information subframe or the first information opportunity associated with the PTCH according to the time-frequency resource configuration information of the PTCH and resource configuration information of the first information.

13. The UE according to claim 11, wherein the instructions for causing the processor to determine that the triggering exists comprise instructions for causing the processor to detect whether the triggering exists according to a result of a correlation operation with the two or more sequences and a pre-configured sequence.

14. The UE according to claim 13, wherein the non-transitory computer readable medium further has stored thereon instructions that, when executed, cause the processor to:
determine the pre-configured sequence based on sequence configuration information.

15. The UE according to the claim 14, wherein the non-transitory computer readable medium further has stored thereon instructions that, when executed, cause the processor to perform one or more of:
determine the sequence configuration information according to a preset convention between a base station and a user equipment (UE);
determine the sequence configuration information according to one or more types of signaling of radio resource control (RRC) common signaling, RRC dedicated signaling, media access control (MAC) control element (CE) signaling, physical layer signaling, and a random access response (RAR); and
determine the sequence configuration information according to a random access preamble sent by the UE.

16. The UE according to claim 11, wherein the non-transitory computer readable medium further has stored thereon instructions that, when executed, cause the processor to:
receive data transmitted on the time-frequency resource of the PTCH before detecting the PTCH, wherein the data transmitted on the time-frequency resource of the PTCH carries indication information used to distinguish uplink triggering from downlink triggering and cyclic redundancy check (CRC) information, and the CRC information is scrambled based on a radio network temporary identifier (RNTI) specific for a cell, a UE, or a group of UEs.

17. A base station, comprising:
a processor; and
a non-transitory computer readable medium connected to the processor and having stored thereon instructions that, when executed, cause the processor to:
determine time-frequency resource configuration information of a physical trigger channel (PTCH), wherein the time-frequency resource configuration information comprises a serial number of a first physicalresource block (PRB) occupied by the PTCH and a number of PRBs occupied by the PTCH;
transmit, to a user equipment (UE) in a power saving state the PTCH on a time-frequency resource indicated by the time-frequency resource configuration information, the PTCH comprising two or more sequences and at least one of the two or more sequences triggers one or more UEs, wherein the two or more sequences are sequences with a zero-correlation zone, the PTCH indicating that a first information specific to the UE is in a first information subframe or a first information opportunity associated with the PTCH, wherein the first information is selected from a group consisting of control information, downlink data, enhanced control information, and enhanced downlink data, wherein while the UE is in the power saving state the base station does not successfully transmit information to the UE on a physical downlink control channel (PDCCH), an enhanced PDCCH, a random access channel (RACH), a physical downlink shared channel (PDSCH), and a physical control format indicator channel (PCFICH); and
transmitting, the first information to the UE in the first information subframe or the first information opportunity associated with the PTCH, wherein the first information is transmitted on a channel different from the PTCH.

18. The base station according to claim 17, wherein the non-transitory computer readable medium further has stored thereon instructions that, when executed, cause the processor to:
determine the first information subframe or the first information opportunity associated with the PTCH; and
wherein the instructions causing the processor to determine the first information subframe or the first information opportunity associated with the PTCH comprise instructions for causing the processor to perform one or more of:
determine the first information subframe or the first information opportunity associated with the PTCH according to the time-frequency resource configuration information of the PTCH and a preset time offset; and
determine the first information subframe or the first information opportunity associated with the PTCH according to the time-frequency resource configuration information of the PTCH and resource configuration information of the first information.

19. The base station according to claim 17, wherein the instructions for causing the processor to transmit the first information to the UE comprise instructions for causing the processor to:
transmit two or more sequences on a PDCCH or an enhanced PDCCH.

20. The base station according to claim 17, wherein the non-transitory computer readable medium further has stored thereon instructions that, when executed, cause the processor to:
prior to transmitting the PTCH, transmit data on the time-frequency resource occupied by the PTCH, wherein the data transmitted carries indication information used to distinguish uplink triggering from downlink triggering and cyclic redundancy check (CRC) information, wherein the CRC information is scrambled by using a radio network temporary identifier (RNTI) specific for a cell, a UE, or a group of UEs, enabling the UE to extract the PTCH from the data transmitted in each subframe on the time-frequency resource occupied by the PTCH.

21. The method according to claim 1, wherein the PTCH is different from a physical downlink control channel (PDCCH), an enhanced PDCCH, a physical uplink control channel (PUCCH), an enhanced PUCCH, a random access channel (RACH), a physical downlink shared channel (PDSCH), a physical uplink shared channel (PUSCH), and a physical control format indicator channel (PCFICH).

* * * * *